United States Patent
Nakao

(10) Patent No.: US 6,617,977 B1
(45) Date of Patent: Sep. 9, 2003

(54) COMMUNICATION UNIT POSITION DETECTING SYSTEM AND RECODING MEDIUM STORING RECORDED COMMUNICATION UNIT POSITION DETECTING PROGRAM

(75) Inventor: Atsushi Nakao, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/524,002

(22) Filed: Mar. 13, 2000

(30) Foreign Application Priority Data

Mar. 11, 1999 (JP) ............................................. 11-065254

(51) Int. Cl.$^7$ ............................................. G08C 19/04
(52) U.S. Cl. ............................... 340/870.11; 340/870.3; 340/870.15
(58) Field of Search ........................... 340/531, 870.07, 340/870.11, 870.15, 870.16, 870.17, 870.3, 505, 573.1, 573.3, 573.4, 573.7; 455/3.01, 3.05, 561

(56) References Cited

U.S. PATENT DOCUMENTS

| | | | | |
|---|---|---|---|---|
| 4,045,799 A | | 8/1977 | Dapiran | 342/419 |
| 4,173,016 A | | 10/1979 | Dickson | 340/505 |
| 5,109,789 A | | 5/1992 | Berman | 116/325 |
| 5,642,095 A | | 6/1997 | Cook | 340/568.7 |
| 6,058,137 A | * | 5/2000 | Partyka | 375/201 |
| 6,265,974 B1 | * | 7/2001 | D'Angelo et al. | 340/568.1 |
| 6,288,643 B1 | * | 9/2001 | Lerg et al. | 340/573.1 |
| 6,313,733 B1 | * | 11/2001 | Kyte | 340/573.4 |
| 6,466,138 B1 | * | 10/2002 | Partyka | 340/870.11 |

FOREIGN PATENT DOCUMENTS

| | | |
|---|---|---|
| DE | 44 11 488 A1 | 10/1995 |
| DE | 195 02 627 A1 | 8/1996 |
| DE | 196 16 576 A1 | 10/1997 |
| DE | 197 26 863 A1 | 1/1999 |
| EP | 0 347 491 A2 | 12/1989 |
| EP | 0 508 939 A2 | 10/1992 |
| EP | 0 919 968 A1 | 6/1999 |
| FR | 2 229 981 A | 12/1974 |
| FR | 2 585 846 A1 | 2/1987 |
| FR | 2 615 957 A1 | 12/1988 |
| GB | 2 223 869 A | 4/1990 |
| GB | 2 299 431 A | 10/1996 |
| JP | 1079987 | 3/1989 |
| JP | 10257571 | 9/1998 |

* cited by examiner

Primary Examiner—Van Trieu
(74) Attorney, Agent, or Firm—Nixon & Vanderhye, PC

(57) ABSTRACT

Communication units are each provided with a wireless communication control section, a timing pattern generating section for generating a specified timing pattern, an informing device control section for controlling an informing device in accordance with an arbitrary timing and a timing pattern analyzing section for analyzing the transmitted timing pattern. The communication unit generates a specified timing pattern in the timing pattern generating section, controls its own informing device in accordance with the timing pattern by the informing device control section and transmits the timing pattern from the wireless communication control section to the communication unit. The communication unit analyzes the timing pattern transmitted from the communication unit and controls its own informing device according to the analyzed timing pattern. This allows a person to reliably find his or her own unit to be searched even when a plural number of persons search different devices in an identical place.

7 Claims, 24 Drawing Sheets

Fig.2

PHYSICAL ADDRESS INFORMATION 18a

| 08 | 00 | 1F | 01 | 02 | 03 |
|----|----|----|----|----|----|

FORMATION PATTERN 1 11a

| 00001000 | 00000000 | 00011111 | 00000001 | 00000010 | 00000011 |
|----------|----------|----------|----------|----------|----------|

FORMATION PATTERN 2 11b

| 0 | 0 | 2 | 0 | 0 | 0 | 0 | 0 | 1 | 3 | 3 | 0 | 0 | 0 | 1 | 0 | 0 | 0 | 2 | 0 | 0 | 0 | 3 |
|---|---|---|---|---|---|---|---|---|---|---|---|---|---|---|---|---|---|---|---|---|---|---|

FORMATION PATTERN 3 11c

| 0 | 8 | 0 | 0 | 1 | F | 0 | 1 | 0 | 2 | 0 | 3 |
|---|---|---|---|---|---|---|---|---|---|---|---|

Fig.3A
SWITCH INFORMATION TABLE

| 0 | TURNED OFF |
|---|---|
| 1 | TURNED ON |

Fig.3B
4-COLOR DISPLAY INFORMATION TABLE

| 0 | BLACK |
|---|---|
| 1 | RED |
| 2 | BLUE |
| 3 | GREEN |

Fig.3C
16-COLOR DISPLAY INFORMATION TABLE

| 0 | BLACK |
|---|---|
| 1 | RED |
| 2 | BLUE |
| 3 | GREEN |
|   | ... |
| 8 | YELLOW |
|   | ... |
| F | WHITE |

Fig.3D
FREGRANCE INFORMATION TABLE

| 00 | ROSEMARY |
|---|---|
| 01 | PEPPERMINT |
| 02 | JASMINE |
|   | ... |

Fig.3E
WIND FORCE INFORMATION TABLE

| 01 | FORCE ONE WIND NORTHWARD |
|---|---|
| 02 | FORCE TWO WIND NORTHWARD |
| 03 | FORCE THREE WIND NORTHWARD |
|   | ... |

Fig.3F
TEMPERATURE INFORMATION TABLE

| 00 | +0° C |
|---|---|
|   | ... |
| 7F | +127° C |
| 80 | −0° C |
|   | ... |
| FF | −127° C |

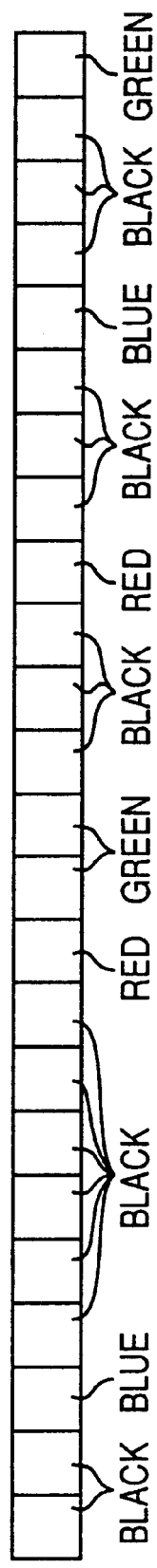

| DESTINATION ADDRESS | ORIGINATING ADDRESS | SEARCH REQUEST COMMAND | ~F1 |

*Fig.5A*

| DESTINATION ADDRESS | ORIGINATING ADDRESS | SEARCH START COMMAND | TIME OF REPEAT | DATA LENGTH | TIMING PATTERN | ~F2 |

*Fig.5B*

| DESTINATION ADDRESS | ORIGINATING ADDRESS | SEARCH END COMMAND | ~F3 |

*Fig.5C*

COMMUNICATION UNIT POSITION DETECTING SYSTEM AND RECODING MEDIUM STORING RECORDED COMMUNICATION UNIT POSITION DETECTING PROGRAM

BACKGROUND OF THE INVENTION

The present invention relates to a communication unit position detecting system for detecting the position of a wireless communication unit to be searched in a wireless network system employing a non-directional communication medium such as an electric wave and to a recording medium that stores a communication unit position detecting program.

Conventionally, there have been proposed various devices for searching a unit of a remote controller or the like of which the location is not found in a wireless communication system.

For example, the prior art reference of Japanese Patent Laid-Open Publication No. HEI 10-257571 discloses a system that includes one of a vibrating means, a sound producing means such as a buzzer, a light emitting means such as a lamp on the unit side where the remote controller or the like is located and operates to transmit a specified signal of an electric wave from the equipment side by a wireless communication means, receive this signal by the wireless communication means on the device side and effect the operation of vibrating the vibration means, buzzing or lighting the lamp on the basis of this received signal, thereby informing the user of the location of the unit by the sense of touch, the sense of hearing and the sense of sight (this being referred to as a first prior art technique).

The prior art reference of Japanese Patent Laid-Open Publication No. HEI 10-79987 discloses a system that includes a sound producing means such as a buzzer on the unit side where a remote controller or the like is located and operates to select a specified signal among a plurality of types of signals by a wireless communication means from the equipment side, transmit the signal by an electric wave, receive this specified signal by the wireless communication means on the unit side and effect the operation of buzzing when the received specified signal coincides with a signal set in the self unit. This allows the user to be informed of the location of the remote controller to be searched even when there is a plurality of remote controllers (this being referred to as a second prior art technique).

However, the aforementioned first and second prior art techniques have the problem that, if a plural number of persons search different devices in an identical place in response to a plurality of units concurrently vibrating, producing sound or emitting light, then there is caused the confusion of the persons who cannot specify the devices to be searched.

SUMMARY OF THE INVENTION

The present invention has been made in order to solve the aforementioned problem and has the object of providing a communication unit position detecting system capable of reliably finding the unit to be searched by a plural number of persons who search the devices even when the persons search different devices in an identical place as well as a recording medium that stores a recorded communication unit position detecting program.

In order to achieve the object, there is provided a communication unit position detecting system having a plurality of communication units connected to one another by way of a wireless network, wherein one communication unit comprises a wireless communication means for putting wireless communication into practice, a timing pattern generating means for generating a specified timing pattern and a control means for controlling an informing device in accordance with an arbitrary timing, another communication unit comprises a wireless communication means for putting wireless communication into practice, a timing pattern analyzing means for analyzing a transmitted specified timing pattern and a control means for controlling an informing device in accordance with the analyzed timing, the one communication unit generates a specified timing pattern by the timing pattern generating means, controlling the informing device in accordance with the generated timing, transmitting the generated timing pattern to another communication unit by the wireless communication means, and another communication unit receives the timing pattern transmitted from the one communication unit by the wireless communication means and controlling the informing device in accordance with the timing pattern analyzed by the timing pattern analyzing means.

With this arrangement, by searching another communication unit that is operating in accordance with the same timing as the operation timing of the informing device of one communication unit, the location of the currently communicating opposite communication unit can be detected by the five senses of the human being. It is merely required to search the communication unit that is operating in accordance with the same timing as that of the self communication unit, and therefore, if a plural number of persons concurrently search different communication units in an identical place, then each person can reliably find the communication unit to be searched.

In an embodiment of the present invention, the informing device of the one communication unit is one of a light emitting device such as an LCD or a lamp, a vibrating device such as a vibrator and a sound producing device such as a buzzer, and the informing device of another communication unit is one of a light emitting device such as an LCD or a lamp, a vibrating device such as a vibrator and a sound producing device such as a buzzer.

This allows the location of the currently communicating opposite communication unit to be detected by one of the sense of touch, the sense of hearing and the sense of sight of the human being.

In an embodiment of the present invention, the light emitting device is comprised of a device that can emit a plurality of colors and the control means executes switching control of the color of light to be emitted according to the generated timing pattern.

This allows the location of the currently communicating opposite communication unit to be detected by the sense of sight of the human being.

In an embodiment of the present invention, the communication unit has a plurality of informing devices and is provided with a selection means for arbitrarily selecting the informing device to be used.

Also, there is provided a communication unit position detecting system having a plurality of communication units connected to one another by way of a wireless network, wherein one communication unit comprises a fragrance generating means for generating a specified fragrance and a transmission means for transmitting information of the type of the generated fragrance, and another communication unit comprises a reception means for receiving information of the type of the transmitted fragrance and a display means for displaying information of the type of the received fragrance.

This allows the location of the currently communicating opposite communication unit to be detected by the sense of smell of the human being.

Also, there is provided a communication unit position detecting system having a plurality of communication units connected to one another by way of a wireless network, wherein one communication unit comprises a wind generating means for generating a flow of air and a transmission means for transmitting wind information representing the occurrence of the flow of air, and another communication unit comprises a reception means for receiving the transmitted wind information and a display means for displaying the received wind information.

This allows the location of the currently communicating opposite communication unit to be detected by the sense of touch of the human being.

In an embodiment of the present invention, the one communication unit is provided with a wind generating source direction detecting means for detecting the direction of the wind generating source generated by the one communication unit.

This allows the location of the currently communicating opposite communication unit to be automatically detected.

Also, there is provided a communication unit position detecting system having a plurality of communication units connected to one another by way of a wireless network, wherein one communication unit comprises a heat generating means for generating heat and a transmission means for transmitting heat information representing the occurrence of heat, and another communication unit comprises a reception means for receiving the transmitted heat information and a display means for displaying the received heat information.

This allows the location of the currently communicating opposite communication unit to be detected by the effective temperature of the human being.

In an embodiment of the present invention, another communication unit is provided with a heat source direction detecting means for detecting the direction of the source of heat generated by the one communication unit.

This allows the location of the currently communicating opposite communication unit to be automatically detected.

Also, there is provided a communication unit position detecting system having a plurality of communication units connected to one another by way of a wireless network, wherein one communication unit comprises a timing pattern generating means for generating a specified timing pattern, a first wireless communication means for transmitting the generated timing pattern by a non-directional communication means and a second wireless communication means for transmitting the generated timing pattern by a directional communication means, and another communication unit comprises a first wireless communication means for receiving a non-directional electric wave, a second wireless communication means for receiving a directional electric wave and a pattern detecting means for comparing the timing patterns of the two types of electric waves received by the wireless communication means and outputting a coincidence signal when both the patterns coincide with each other.

This allows the location of the currently communicating opposite communication unit to be automatically detected.

Also, there is provided a recording medium in which a communication unit position detecting program to be executed by a computer is recorded, wherein the program comprises:

a process for generating a specified timing pattern by a timing pattern generating means, a process for controlling an informing device in accordance with the generated timing pattern, a process for transmitting the generated timing pattern by a wireless communication means, and a process for receiving the transmitted timing pattern by the wireless communication means and controlling the informing device in accordance with a timing pattern analyzed by a timing pattern analyzing means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an explanatory view showing an example of physical address information stored in an address storage section and examples of timing patterns generated in a timing pattern generating section;

FIGS. 3A through 3F are explanatory views showing examples of various information tables owned by a wireless communication unit;

FIGS. 4A through 4C are explanatory views showing examples of timings for controlling the informing device of a wireless communication unit;

FIGS. 5A through 5C are charts of communication frame formats;

DETAILED DESCRIPTION OF THE PREFERRED EMBODIMENTS

Embodiments of the present invention will be described below with reference to the accompanying drawings.

First Embodiment

Figure 1:
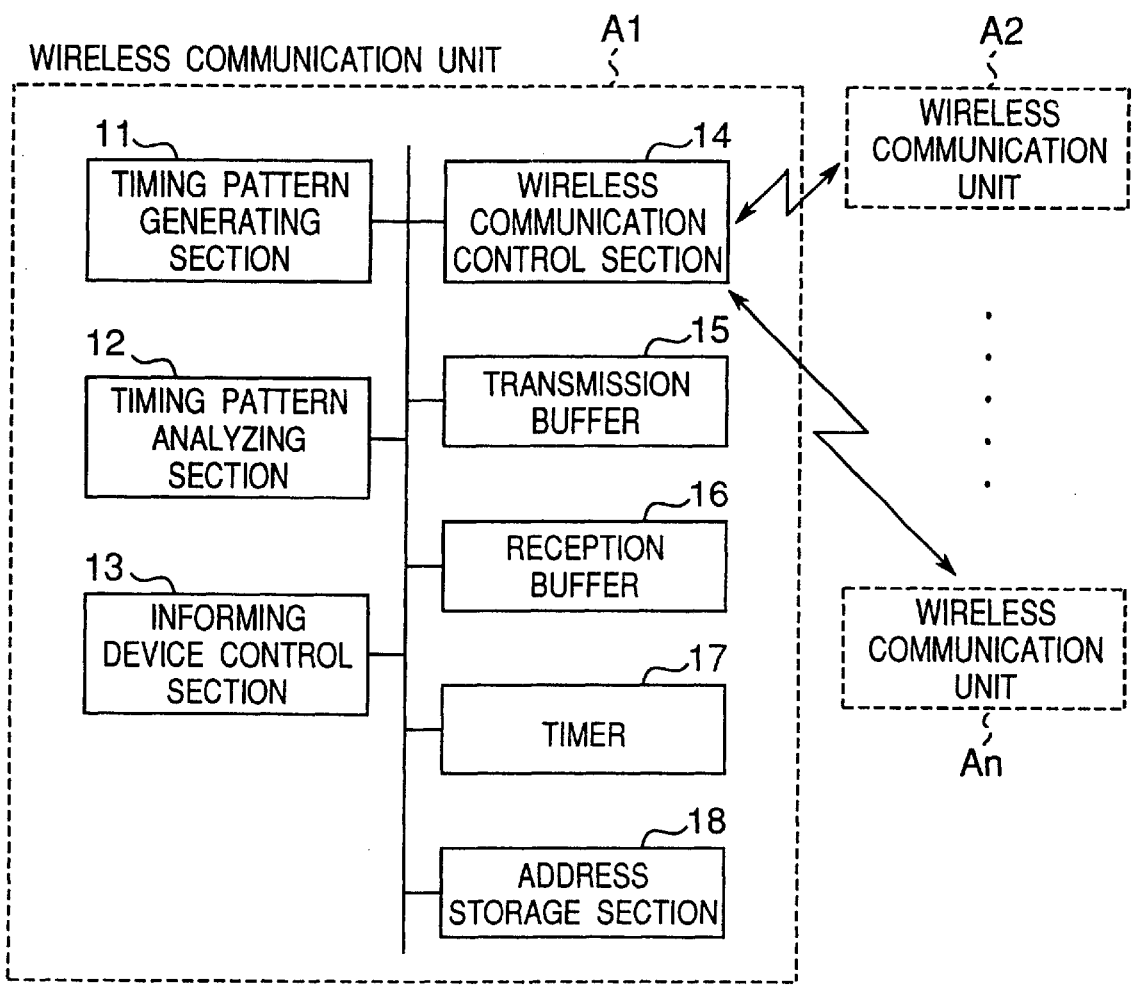
FIG. 1 is a block diagram showing the first embodiment of a wireless communication unit for putting the communication unit position detecting system of the present invention into practice.

FIG. 1 is a block diagram showing the first embodiment of a wireless communication unit for putting the communication unit position detecting system of the present invention into practice, corresponding to the claim 1.

In the figure are shown wireless communication units A1, A2, . . . , An. The wireless communication units A1, A2, . . . , An have an identical construction except that is specific physical address information is individually assigned to each device. Therefore, the wireless communication unit A1 will be concretely described hereinbelow.

That is, the wireless communication unit A1 has an address storage section 18 for storing the physical address information specifically assigned to each device, a timing pattern generating section 11 for generating a specific timing pattern from the address information, a timing pattern analyzing section 12 for analyzing and processing the timing pattern generated in its own timing pattern generating section 11 or the timing patterns received from the other wireless communication units A2, . . . , An, an informing device control section 13 for operating an informing device in accordance with the timing analyzed by the timing pattern analyzing section 12, a wireless communication control section 14 for executing control of transmission and reception of various frames, a transmission buffer 15 for storing the frame to be transmitted to the other wireless communication units, a reception buffer 16 for storing the frames transmitted from the other communication units and a timer 17 for measuring the time of repeat of the pattern included in the frame to be transmitted and received.

The address storage section 18 stores a 6-byte specific physical address information referred to as a call sign in the present first embodiment. The timing pattern generating section 11 takes out the address information stored in this address storage section 18 and processes the information to generate a timing pattern specific to each terminal.

FIG. 2 shows an example of the physical address information stored in the address storage section 18 and examples of the timing patterns generated in the timing pattern generating section 11.

According to the examples, a timing pattern 11a of 1-bit representation, a timing pattern 11b of 2-bit representation and a timing pattern 11c of 4-bit representation are generated from a physical address information 18a of "08 00 1F 01 02 03".

FIGS. 3A through 3F show examples of various switch information tables that control the informing device in the informing device control section 13 and includes a switch information table shown in FIG. 3A, a 4-color display information table shown in FIG. 3B described hereinbelow, a 16-color display information table shown in FIG. 3C described hereinbelow, a fragrance information table shown in FIG. 3D described hereinbelow, a wind force information table shown in FIG. 3E described hereinbelow and a temperature information table shown in FIG. 3F described hereinbelow.

The switch information table shown in FIG. 3A is to turn on and off the switch of a buzzer, an LCD, a lamp, a vibrator or the like according to the pattern of "0" and "1". For example, in the case of the timing pattern 11a of 1-bit representation shown in FIG. 2, the switching control shown in FIG. 4A is executed.

In the 4-color display information table, the data of four colors (black, red, blue, green) are set in the color setting register of the device. Therefore, in the case of the timing pattern 11b of 2-bit representation shown in FIG. 2, the colors are set according to the sequence shown in FIG. 4B.

In the 16-color display information table, the data of 16 colors (black, red, blue, yellow, . . . , green, . . . , white) are set in the color setting register of the device. Therefore, in the case of the timing pattern 11c of 4-bit representation shown in FIG. 2, the colors are set according to the sequence shown in FIG. 4C.

Although the informing device is different, the device control can be similarly executed in the case of the tables of FIGS. 3D through 3F.

FIGS. 5A through 5C are schematic charts of frames for use in transmitting a positional detection timing pattern. That is, when issuing a positional detection request at the start of positional detection, a search request command frame F1 having the format shown in FIG. 5A is used. At an informing device operation start time for positional detection, a search start command frame F2 having the format shown in FIG. 5B is used. At an informing device operation end time, a search end command frame F3 having the format shown in FIG. 5C is used.

Figure 6:
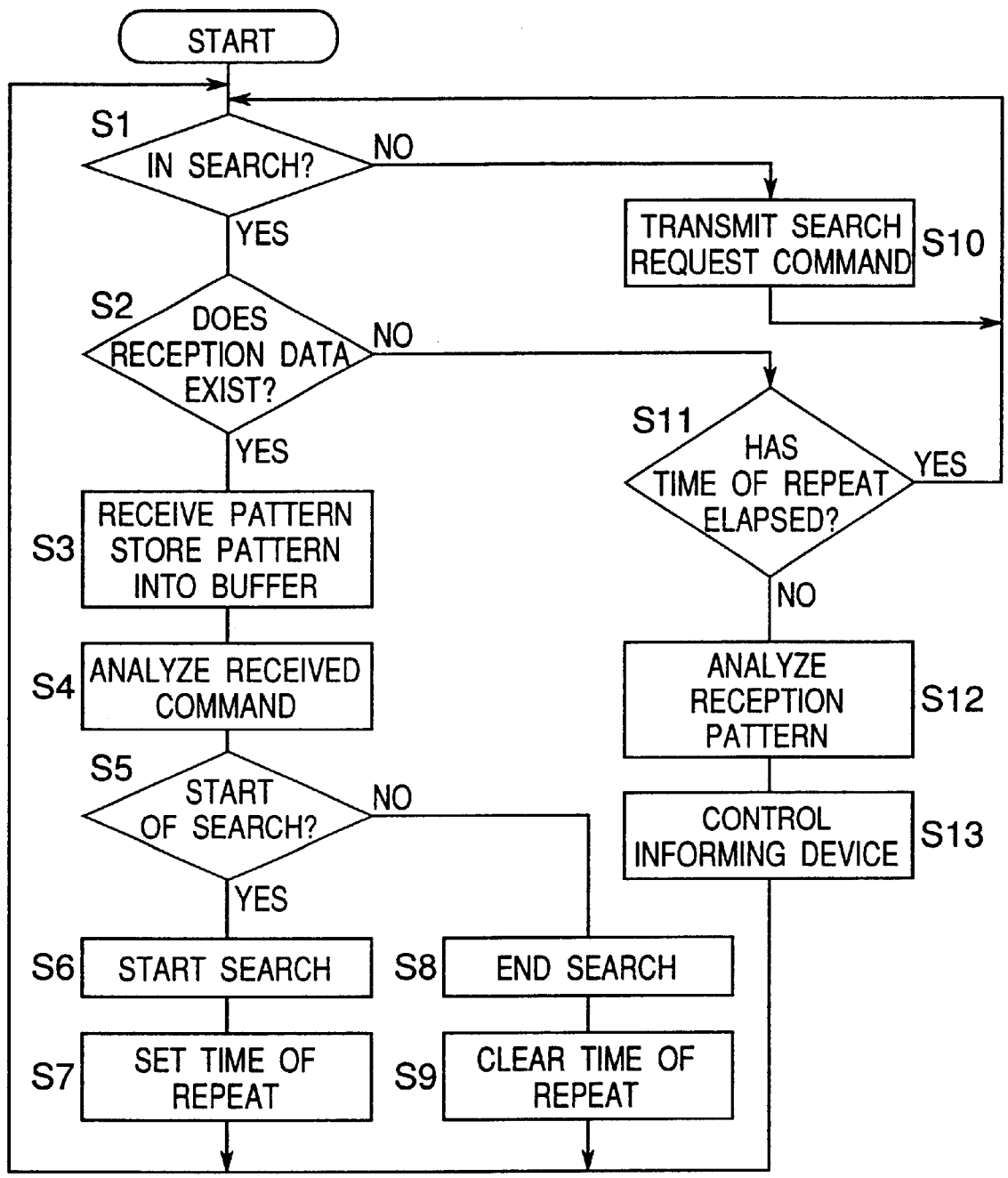
FIG. 6 is a chart of the operation sequence of a wireless communication unit that executes searching.
Figure 7:
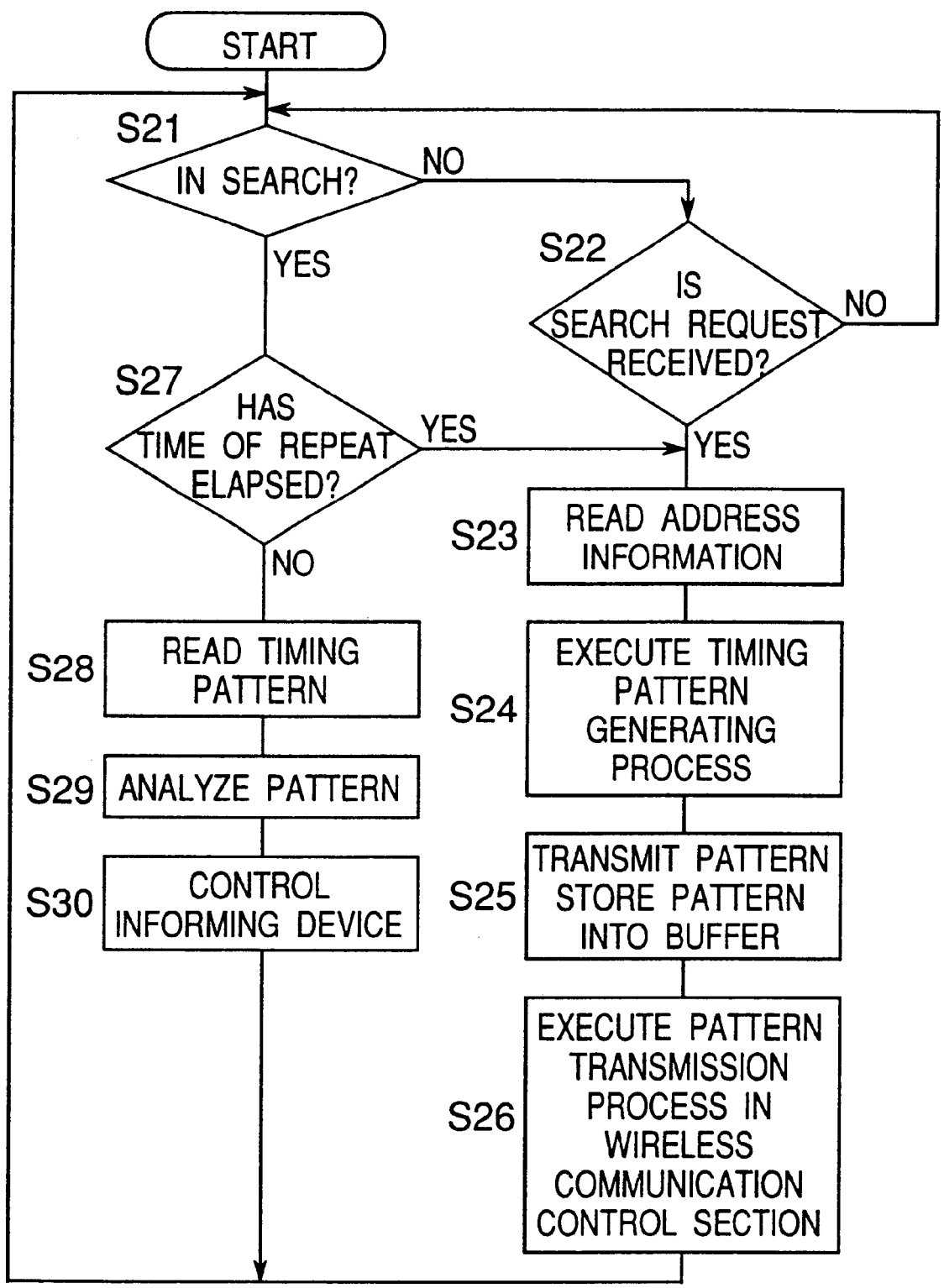
FIG. 7 is a chart of the operation sequence of a wireless communication unit to be searched.

Next, a procedure for executing positional detection in the wireless communication units A1, A2, An having the aforementioned construction will be described with reference to the operation sequence charts shown in FIG. 6 and FIG. 7. It is to be noted that FIG. 6 is the operation sequence chart of the wireless communication unit that executes searching (another communication unit disclosed in the claims) and FIG. 7 is the operation sequence chart of the wireless communication unit to be searched (the one communication unit disclosed in the claims). The following description is based on the assumption that the wireless communication unit that executes searching (referred to as a self side wireless communication unit hereinafter) is defined as A1 and the wireless communication unit to be searched (referred to as the opposite side wireless communication unit hereinafter) is defined as A2. It is to be noted that the reference numerals of the components constituting the opposite side wireless communication unit A2 are denoted by the same reference numerals as those of the components constituting the self side wireless communication unit A1.

If a non-directional wireless communication means such as an electric wave is used in a state in which the self side wireless communication unit A1 and the opposite side wireless communication unit A2 are communicating by means of the wireless communication control section 14, then the location of the opposite side wireless communication unit A2 cannot be recognized.

Accordingly, when searching the location of the opposite side wireless communication unit A2, the self side wireless communication unit A1 first confirms whether or not search is started (step S1). If the search is not started, then the unit A1 transmits the search request command frame F1 to the opposite side wireless communication unit A2 by the wireless communication control section 14 (step S10).

When receiving the search request command frame F1 (see FIG. 5A and so forth hereinafter) (when a affirmative decision of YES is made in step S22), the opposite side wireless communication unit A2 reads the physical address information 18a (see FIG. 2 and so forth hereinafter) from the address storage section 18 (step S23) and generates a timing pattern (for example, the timing pattern 11a shown in FIG. 2) specific to the opposite side wireless communication unit A2 from the physical address information 18a in the timing pattern generating section 11 (step S24). Then, the unit A2 forms the search start command frame F2 (see FIG. SB and so forth hereinafter) from the generated timing pattern 11a and stores the same into the transmission buffer 15 (step S25). Subsequently, the unit A2 transmits the search start command frame F2 stored in the transmission buffer 15 to the self side wireless communication unit A1 by the wireless communication control section 14 (step S26).

Concurrently, the opposite side wireless communication unit A2 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and controls the switch of the informing device according to the analyzed timing pattern (see FIG. 4A) (step S30).

When receiving the search start command frame F2 (when the affirmative decision of YES is made in step S2), the self side wireless communication unit A1 stores the received search start command frame F2 into the reception buffer 16 (step S3). If the timing pattern analyzing section 12 recognizes that the received command is the search start command frame F2 (when the affirmative decision of YES is made in step S5) as a result of analysis of the frame stored in the reception buffer 16 (step S4), then the unit A1 starts to search the opposite side wireless communication unit A2 (step S6) and sets the data of the time of repeat included in the search start command frame F2 in the internal timer 17 (step S7). Subsequently, until this time of repeat elapses (when the affirmative decision of YES is made in step S11 via step S1 and step S2), the unit A1 analyzes the received timing pattern by means of the switch information table shown in FIG. 3A (step S12) and controls the switch of the informing device according to the timing pattern (see FIG. 4A) in the informing device control section 13 (step S13).

By thus operating the informing device of the self side wireless communication unit A1 and the informing device of the opposite side wireless communication unit A2 in accordance with same timing, the user can easily search the location of the opposite side wireless communication unit A2 by the five senses.

Second Embodiment

Figure 8:
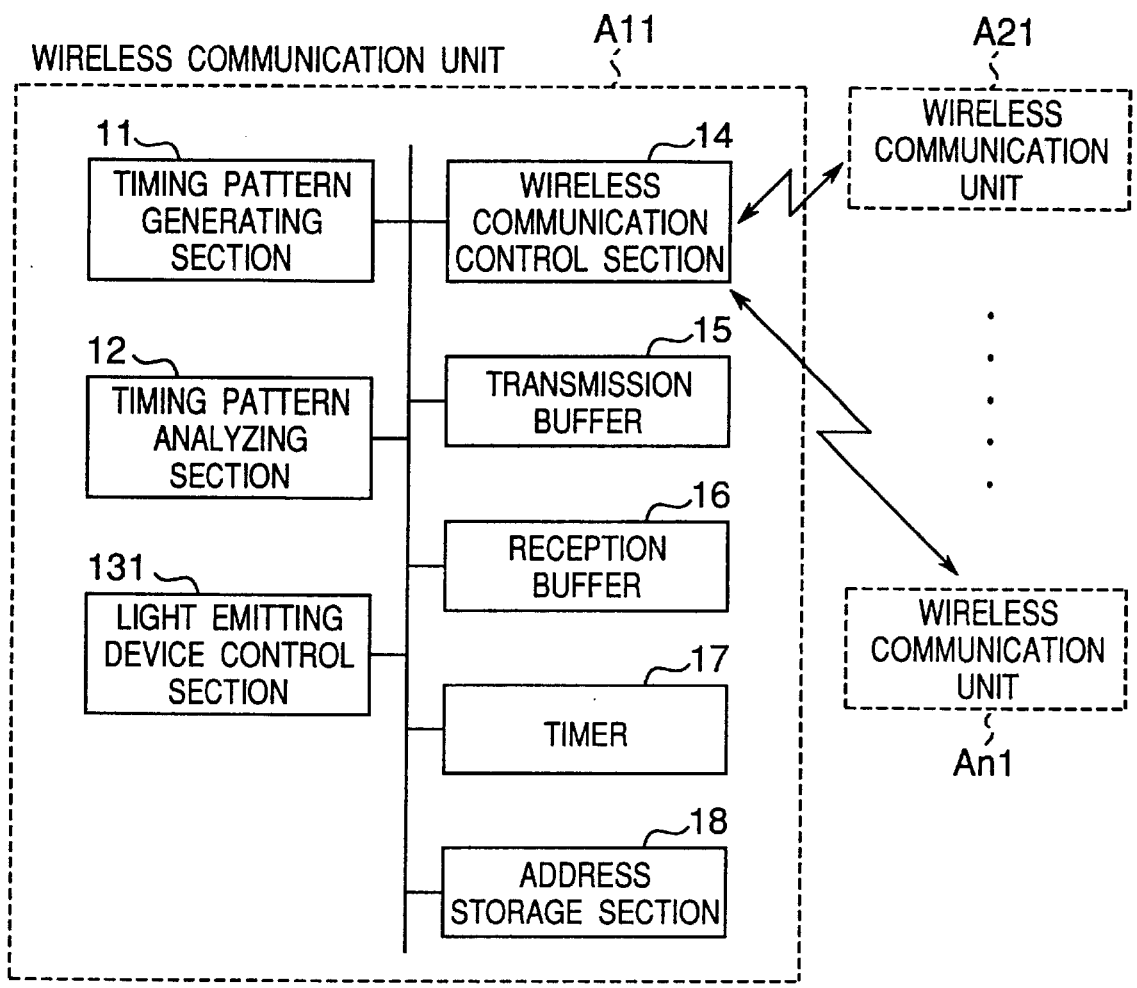
FIG. 8 is a block diagram showing the second embodiment of a wireless communication unit for putting the communication unit position detecting system of the present invention into practice.

FIG. 8 is a block diagram showing the second embodiment of a wireless communication unit for putting the communication unit position detecting system of the present invention into practice, corresponding to the claim 2.

In the figure are shown wireless communication units A11, A21, . . . , An1. There are shown a timing pattern generating section 11, a timing pattern analyzing section 12, a wireless communication control section 14, a transmission buffer 15, a reception buffer 16, a timer 17 and an address storage section 18. These components have constructions similar to those of the components shown in FIG. 1, and therefore, same reference numerals are given to these components with no detailed description provided for them. The reference numeral 131 denotes a light emitting device control section that executes flashing control of the switch of the light emitting device such as an LCD or a lamp in accordance with the timing analyzed by the timing pattern analyzing section 12 and serves as a concrete example of the informing device control section shown in FIG. 1.

A procedure for executing positional detection with the wireless communication units A11, A21, . . . , An1 having the aforementioned construction will be described next with reference to the operation sequence charts shown in FIG. 6 and FIG. 7. It is to be noted that FIG. 6 is the operation sequence chart of the wireless communication unit that executes searching and FIG. 7 is the operation sequence chart of the wireless communication unit to be searched. FIG. 6 and FIG. 7 are used in the first embodiment. However, the sequence itself is similar in the present second embodiment, and therefore, the operations of the self side wireless communication unit and the opposite side wireless communication unit will be described with reference to FIG. 6 and FIG. 7. The following description is based on the assumption that the self side wireless communication unit that executes searching is defined as A11 and the opposite side wireless communication unit to be searched is defined as A21. It is to be noted that the reference numerals of the components constituting the opposite side wireless communication unit A21 are denoted by the same reference numerals of the components constituting the self side wireless communication unit A11. The frame to be transmitted uses the frame format shown in FIGS. 5A through 5C.

If a non-directional wireless communication means such as an electric wave is used in a state in which the self side wireless communication unit A11 and the opposite side wireless communication unit A21 are communicating by means of the wireless communication control section 14, then the location of the opposite side wireless communication unit A21 cannot be recognized.

Accordingly, when searching the location of the opposite side wireless communication unit A21, the self side wireless communication unit A11 first confirms whether or not search is started (step S1). If the search is not started, then the unit A11 transmits the search request command frame F1 to the opposite side wireless communication unit A21 by the wireless communication control section 14 (step S10).

When receiving the search request command frame F1 (see FIG. 5A and so forth hereinafter) (when a affirmative decision of YES is made in step S22), the opposite side wireless communication unit A21 reads the physical address information 18a (see FIG. 2 and so forth hereinafter) from the address storage section 18 (step S23) and generates a timing pattern (for example, the timing pattern 11a shown in FIG. 2) specific to the opposite side wireless communication unit A21 from the physical address information 18a in the timing pattern generating section 11 (step S24). Then, the unit A21 forms the search start command frame F2 (see FIG. 5B and so forth hereinafter) from the generated timing pattern 11a and stores the same into the transmission buffer 15 (step S25). Subsequently, the unit A21 transmits the search start command frame F2 stored in the transmission buffer 15 to the self side wireless communication unit A11 by the wireless communication control section 14 (step S26).

Concurrently, the opposite side wireless communication unit A21 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and controls the switch of the light emitting device such as an LCD or a lamp according to the analyzed timing pattern (see FIG. 4A) by means of the light emitting device control section 131 so as to flash the device (step S30).

When receiving the search start command frame F2 (when the affirmative decision of YES is made in step S2), the self side wireless communication unit A11 stores the received search start command frame F2 into the reception buffer 16 (step S3). If the timing pattern analyzing section 12 recognizes that the received command is the search start command frame F2 (when the affirmative decision of YES is made in step S5) as a result of analysis of the frame stored in the reception buffer 16 (step S4), then the unit A11 starts to search the opposite side wireless communication unit A21 (step S6) and sets the data of the time of repeat included in the search start command frame F2 in the internal timer 17 (step S7). Subsequently, until this time of repeat elapses (when the affirmative decision of YES is made in step S11 via step S1 and step S2), the unit A11 analyzes the received timing pattern by means of the switch information table shown in FIG. 3A (step S12) and controls the switch of the light emitting device such as an LCD or a lamp according to the timing pattern (see FIG. 4A) by means of the light emitting device control section 131 so as to flash the device (step S13).

By thus flashing the light emitting device of the self side wireless communication unit A11 and the light emitting device of the opposite side wireless communication unit A21 in accordance with same timing, the user can easily search the location of the opposite side wireless communication unit A21 by the sense of sight.

In this case, by using the light emitting device that can emit light of a plurality of colors for the light emitting device control section 131 shown in FIG. 8, it is enabled to execute searching by a change in color corresponding to the claim 3. For example, if a device capable of emitting light of four colors is used, by generating the timing pattern 11b of 2-bit representation shown in FIG. 2, analyzing the pattern by means of the 4-color display information table (see FIG. 3B) and controlling switchover between the colors of the light emitting device in accordance with the timing shown in FIG. 4B, then the color of the light emitting device such as an LCD or a lamp can be changed in accordance with same timing in the opposite side wireless communication unit A21 and the self side wireless communication unit A11 in communication. By this operation, the location of the wireless communication unit that is desired to be searched by the user can be correctly searched even when a plurality of wireless communication units exist. If a light emitting device capable of emitting light of 16 colors, by generating the timing pattern 11b of 4-bit representation shown in FIG. 2, analyzing the pattern by means of the 16-color display information table (see FIG. 3C) and controlling switchover between the colors of the light emitting device in accordance with the timing shown in FIG. 4C, then the color of the light emitting device such as an LCD or a lamp can be changed in accordance with same timing in the opposite side wireless communication unit A21 and the self side wireless communication unit A11 in communication.

Third Embodiment

Figure 9:
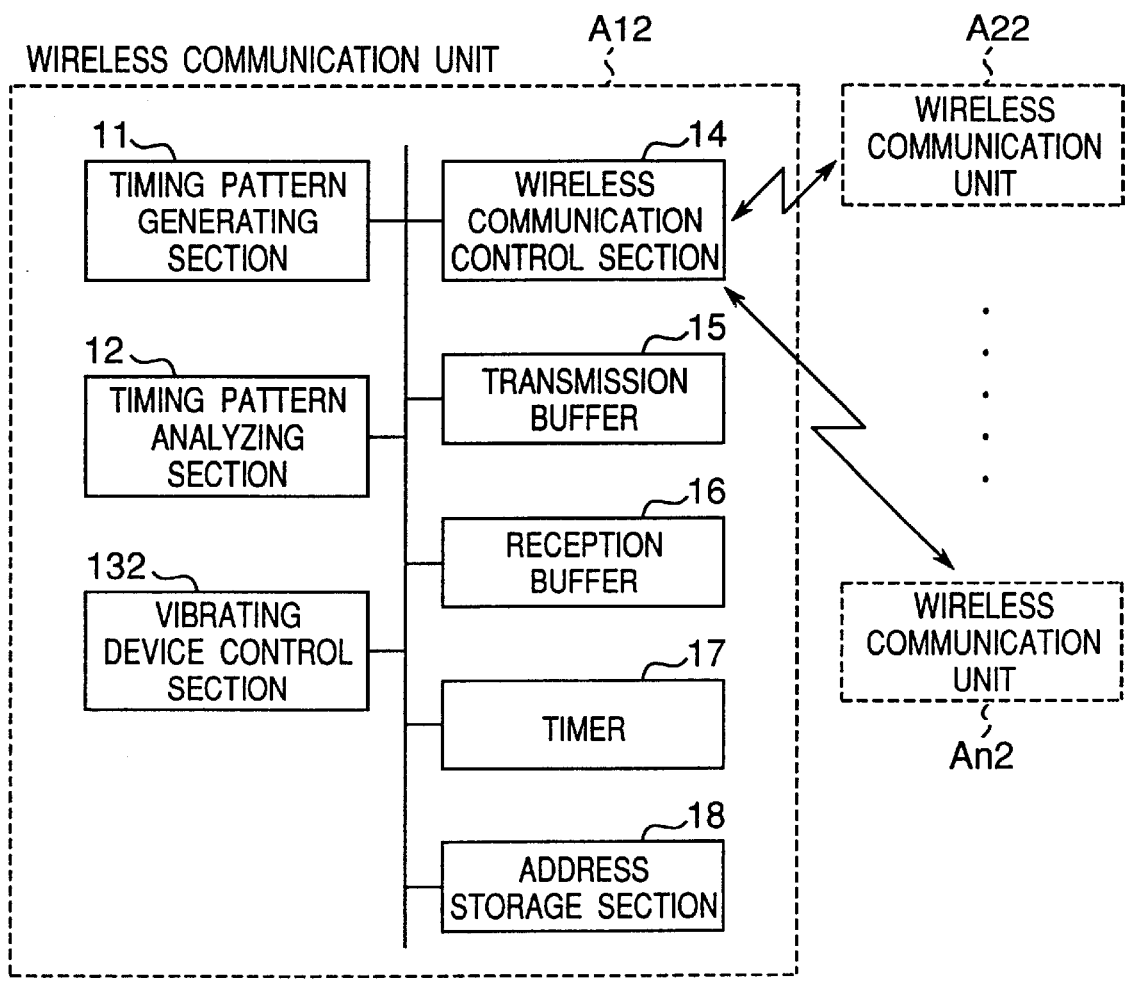
FIG. 9 is a block diagram showing the third embodiment of a wireless communication unit for putting the communication unit position detecting system of the present invention into practice.

FIG. 9 is a block diagram showing the third embodiment of a wireless communication unit for putting the communication unit position detecting system of the present invention into practice, corresponding to the claim 2.

In the figure are shown a timing pattern generating section 11, a timing pattern analyzing section 12, a wireless communication control section 14, a transmission buffer 15, a reception buffer 16, a timer 17 and an address storage section 18. These components have constructions similar to those of the components shown in FIG. 1, and therefore, same reference numerals are given to these components with no detailed description provided for them. The reference numeral 132 denotes a vibrating device control section that executes switching control of the vibrating device such as a vibrator in accordance with the timing analyzed by the timing pattern analyzing section 12 and serves as a concrete example of the informing device control section shown in FIG. 1.

A procedure for executing positional detection with the wireless communication units A12, A22, . . . , An2 having the aforementioned construction will be described next with reference to the operation sequence charts shown in FIG. 6 and FIG. 7. FIG. 6 and FIG. 7 are used in the first embodiment. However, the sequence itself is similar in the present third embodiment, and therefore, the operations of the self side wireless communication unit and the opposite side wireless communication unit will be described with reference to FIG. 6 and FIG. 7. The following description is based on the assumption that the self side wireless communication unit that executes searching is defined as A12 and the opposite side wireless communication unit to be searched is defined as A22. It is assumed that only the self side wireless communication unit A12 has the vibrating device control section 132 and the opposite side wireless communication unit A22 has the light emitting device control section 131 shown in FIG. 8. It is to be noted that the reference numerals of the components constituting the opposite side wireless communication unit A22 are denoted by the same reference numerals of the components constituting the self side wireless communication unit A12. The frame to be transmitted uses the frame format shown in FIGS. 5A through 5C.

If a non-directional wireless communication means such as an electric wave is used in a state in which the self side wireless communication unit A12 and the opposite side wireless communication unit A22 are communicating by means of the wireless communication control section 14, then the location of the opposite side wireless communication unit A22 cannot be recognized.

Accordingly, when searching the location of the opposite side wireless communication unit A22, the self side wireless communication unit A12 first confirms whether or not search is started (step S1). If the search is not started, then the unit A12 transmits the search request command frame F1 to the opposite side wireless communication unit A22 by the wireless communication control section 14 (step S10).

When receiving the search request command frame F1 (when a affirmative decision of YES is made in step S22), the opposite side wireless communication unit A22 reads the physical address information 18a from the address storage section 18 (step S23) and generates a timing pattern (for example, the timing pattern 11a shown in FIG. 2) specific to the opposite side wireless communication unit A22 from the physical address information 18a in the timing pattern generating section 11 (step S24). Then, the unit A22 forms the search start command frame F2 from the generated timing pattern 11a and stores the same into the transmission buffer 15 (step S25). Subsequently, the unit A22 transmits the search start command frame F2 stored in the transmission buffer 15 to the self side wireless communication unit A12 by the wireless communication control section 14 (step S26).

Concurrently, the opposite side wireless communication unit A22 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and controls the switch of the light emitting device such as an LCD or a lamp according to the analyzed timing pattern (see FIG. 4A) by means of the light emitting device control section 131 so as to flash the device (step S30).

When receiving the search start command frame F2 (when the affirmative decision of YES is made in step S2), the self side wireless communication unit A12 stores the received search start command frame F2 into the reception buffer 16 (step S3). If the timing pattern analyzing section 12 recognizes that the received command is the search start command frame F2 (when the affirmative decision of YES is made in step S5) as a result of analysis of the frame stored in the reception buffer 16 (step S4), then the unit A12 starts to search the opposite side wireless communication unit A22 (step S6) and sets the data of the time of repeat included in the search start command frame F2 in the internal timer 17 (step S7). Subsequently, until this time of repeat elapses (when the affirmative decision of YES is made in step S11 via step S1 and step S2), the unit A12 analyzes the received timing pattern by means of the switch information table shown in FIG. 3A (step S12) and controls the switch of the vibrating device such as a vibrator according to the timing pattern (see FIG. 4A) by the vibrating device control section 132 so as to execute vibrating (step S13).

By thus vibrating the vibrating device of the self side wireless communication unit A12 and flashing the light emitting device of the opposite side wireless communication unit A22 in accordance with same timing, the user can easily search the location of the opposite side wireless communication unit A22 by the sense of sight and the sense of touch.

Fourth Embodiment

Figure 10:
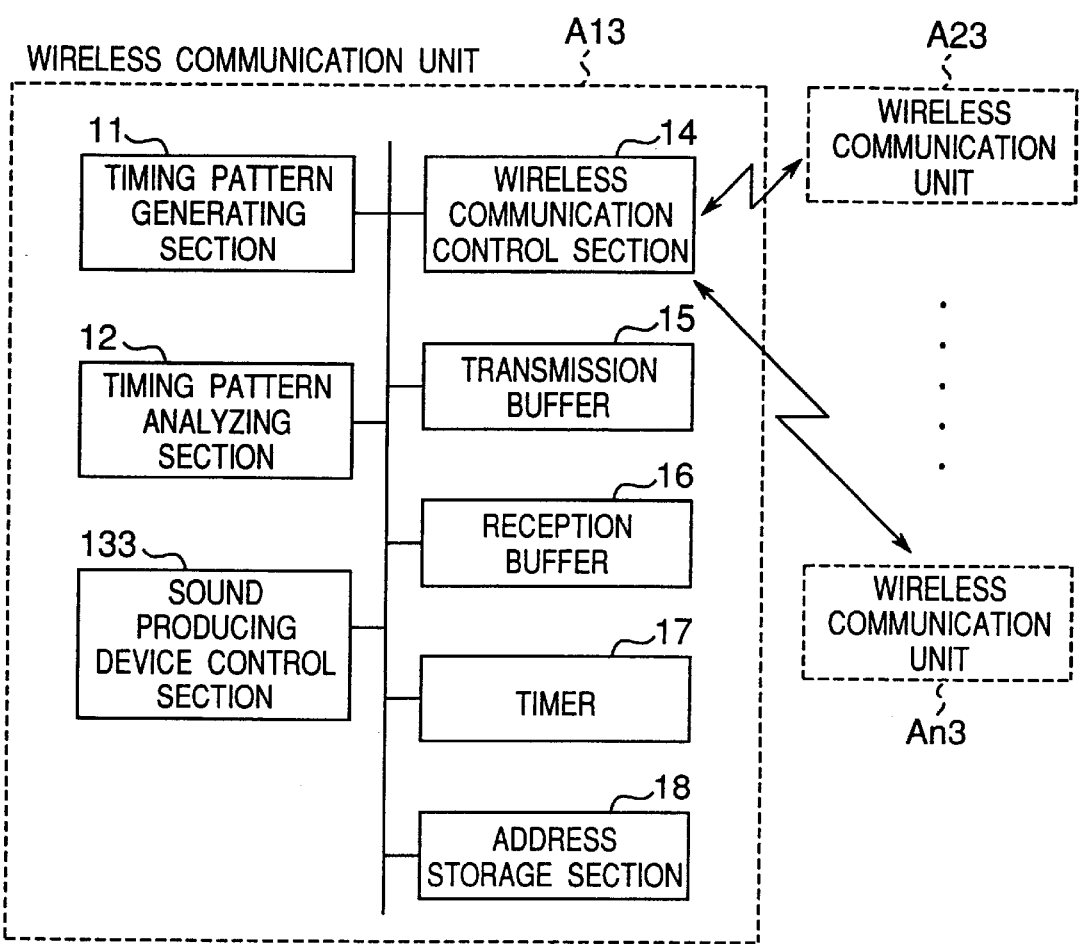
FIG. 10 is a block diagram showing the fourth embodiment of a wireless communication unit for putting the communication unit position detecting system of the present invention into practice.

FIG. 10 is a block diagram showing the fourth embodiment of a wireless communication unit for putting the communication unit position detecting system of the present invention into practice, corresponding to the claim 2.

In the figure are shown a timing pattern generating section 11, a timing pattern analyzing section 12, a wireless communication control section 14, a transmission buffer 15, a reception buffer 16, a timer 17 and an address storage section 18. These components have constructions similar to those of the components shown in FIG. 1, and therefore, same reference numerals are given to these components with no detailed description provided for them. The reference numeral 133 denotes a sound producing device control section that executes switching control of the sound producing device such as a buzzer in accordance with the timing analyzed by the timing pattern analyzing section 12 and serves as a concrete example of the informing device control section shown in FIG. 1.

A procedure for executing positional detection with the wireless communication units A13, A23, . . . , An3 having the aforementioned construction will be described next with reference to the operation sequence charts shown in FIG. 6 and FIG. 7. FIG. 6 and FIG. 7 are used in the first embodiment. However, the sequence itself is similar in the present fourth embodiment, and therefore, the operations of the self side wireless communication unit and the opposite side wireless communication unit will be described with reference to FIG. 6 and FIG. 7. The following description is based on the assumption that the self side wireless communication unit that executes searching is defined as A13 and the opposite side wireless communication unit to be searched is defined as A23. It is assumed that both the self side wireless communication unit A13 and the opposite side wireless communication unit A23 have the sound producing device control section 133. It is to be noted that the reference numerals of the components constituting the opposite side wireless communication unit A23 are denoted by the same reference numerals of the components constituting the self side wireless communication unit A13. The frame to be transmitted uses the frame format shown in FIGS. 5A through 5C.

If a non-directional wireless communication means such as an electric wave is used in a state in which the self side wireless communication unit A13 and the opposite side wireless communication unit A23 are communicating by means of the wireless communication control section 14, then the location of the opposite side wireless communication is unit A23 cannot be recognized.

Accordingly, when searching the location of the opposite side wireless communication unit A23, the self side wireless communication unit A13 first confirms whether or not search is started (step S1). If the search is not started, then the unit A13 transmits the search request command frame F1 to the opposite side wireless communication unit A23 by the wireless communication control section 14 (step S10).

When receiving the search request command frame F1 (when a affirmative decision of YES is made in step S22), the opposite side wireless communication unit A23 reads the physical address information 18a from the address storage section 18 (step S23) and generates a timing pattern (for example, the timing pattern 11a shown in FIG. 2) specific to the opposite side wireless communication unit A23 from the physical address information 18a in the timing pattern generating section 11 (step S24). Then, the unit A23 forms the search start command frame F2 from the generated timing pattern 11a and stores the same into the transmission buffer 15 (step S25). Subsequently, the unit A23 transmits the search start command frame F2 stored in the transmission buffer 15 to the self side wireless communication unit A13 by the wireless communication control section 14 (step S26).

Concurrently, the opposite side wireless communication unit A23 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and controls the switch of the sound producing device such as a buzzer according to the timing pattern (see FIG. 4A) by the sound producing device control section 133 (step S30).

When receiving the search start command frame F2 (when the affirmative decision of YES is made in step S2), the self side wireless communication unit A13 stores the received search start command frame F2 into the reception buffer 16 (step S3). If the timing pattern analyzing section 12 recognizes that the received command is the search start command frame F2 (when the affirmative decision of YES is made in step S5) as a result of analysis of the frame stored in the reception buffer 16 (step S4), then the unit A13 starts to search the opposite side wireless communication unit A23 (step S6) and sets the data of the time of repeat included in the search start command frame F2 in the internal timer 17 (step S7). Subsequently, until this time of repeat elapses (when the affirmative decision of YES is made in step S11 via step S1 and step S2), the unit A13 analyzes the received timing pattern by means of the switch information table shown in FIG. 3A (step S12) and controls the switch of the sound producing device such as a buzzer according to the timing pattern (see FIG. 4A) by the sound producing device control section 133 (step S13).

By thus turning on and off the sound producing device of the self side wireless communication unit A13 and the sound producing device of the opposite side wireless communication unit A23 in accordance with same timing, the user can easily search the location of the opposite side wireless communication unit A23 by the sense of hearing.

Besides the aforementioned second through fourth embodiments, the user can easily search the locations of the opposite side wireless communication units A21 through A23 through the sense of sight and the sense of hearing by using a light emitting device for the opposite side wireless communication units A21 through A23, using a sound producing device for the self side wireless communication units A11 through A13 and flashing the light emitting devices such as lamps of the opposite side wireless communication units A21 through A23 in accordance with the same timing as the sound producing of the sound producing devices such as buzzers of the self side wireless communication units A11 through A13 in communication. The user can easily search the locations of the opposite side wireless communication units A21 through A23 through the sense of sight and the sense of hearing by using a sound producing device for the opposite side wireless communication units A21 through A23, using a light emitting device for the self side wireless communication units A11 through A13 and making the sound producing device such as buzzers of the opposite side wireless communication units A21 through A23 produce sound in accordance with the same timing as the light emission of the light emitting device such as lamps of the self side wireless communication units A11 through A13 in communication. The user can easily search the locations of the opposite side wireless communication units A21 through A23 through the sense of sight and the sense of touch by using a sound producing device for the opposite side wireless communication units A21 through A23, using a vibrating device for the self side wireless communication units A11 through A13 and making the sound producing device such as buzzers of the opposite side wireless communication units A21 through A23 produce sound in accordance with the same timing as the vibration of the vibrating device such as vibrators of the self side wireless communication units A11 through A13 in communication. That is, the informing devices of the self side wireless communication units A11 through A13 and the informing devices of the opposite side wireless communication units A21 through A23 can be provided by an arbitrary combination of the light emitting device, the vibrating device and the sound producing device.

Fifth Embodiment

Figure 11:
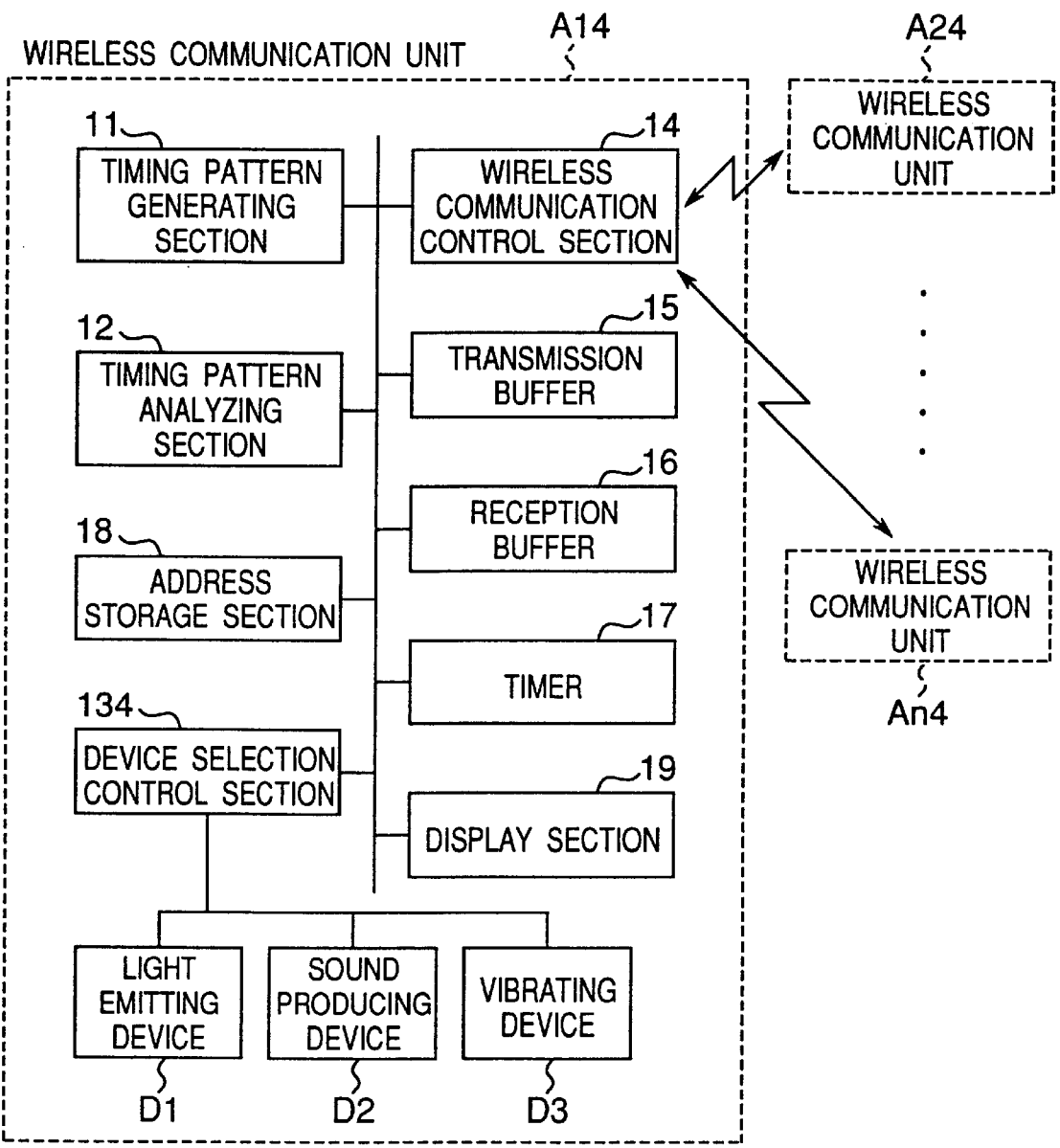
FIG. 11 is a block diagram showing the fifth embodiment of a wireless communication unit for putting the communication unit position detecting system of the present invention into practice.

FIG. 11 is a block diagram showing the fifth embodiment of a wireless communication unit for putting the communication unit position detecting system of the present invention into practice, corresponding to the claim 4.

In the figure are shown a timing pattern generating section 11, a timing pattern analyzing section 12, a wireless communication control section 14, a transmission buffer 15, a reception buffer 16, a timer 17 and an address storage section 18. These components have constructions similar to those of the components shown in FIG. 1, and therefore, same reference numerals are given to these components with no detailed description provided for them. The reference numeral 134 denotes a device selecting control section that select one of a light emitting device D1, a sound producing device D2 and a vibrating device D3, executes switching control of the selected device in accordance with the timing analyzed by the timing pattern analyzing section 12 and serves as a concrete example of the informing device shown in FIG. 1. The reference numeral 19 denotes a display section.

Figure 12A:
FIGS. 12A through 12C are schematic charts of frames for use in transmitting a timing pattern of positional detection.
Figure 12B:
Figure 12C:
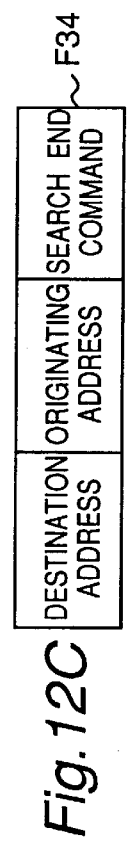

FIGS. 12A through 12C are schematic charts of frames for use in transmitting a timing pattern of positional detection. That is, when issuing a positional detection request at the start of positional detection, a search request command frame F14 having the format shown in FIG. 12A is used. At an informing device operation start time for positional detection, a search start command frame F24 having the format shown in FIG. 12B is used. At an informing device operation end time, a search end command frame F34 having the format shown in FIG. 12C is used. A difference between the search request command frame F14 shown in FIG. 12A and the search request command frame F1 shown in FIG. 5A is that device information (other unit device) to be used for the opposite side wireless communication unit and the device information (self unit device) to be used for the self side wireless communication unit are newly added for the search request command frame F14. Likewise, a difference between the search start command frame F24 shown in FIG. 12B and the search start command frame F2 shown in FIG. 5B is that device information (other unit device) to be used for the opposite side wireless communication unit and the device information (self unit device) to be used for the self side wireless communication unit are newly added for the search start command frame F24.

Figure 13:
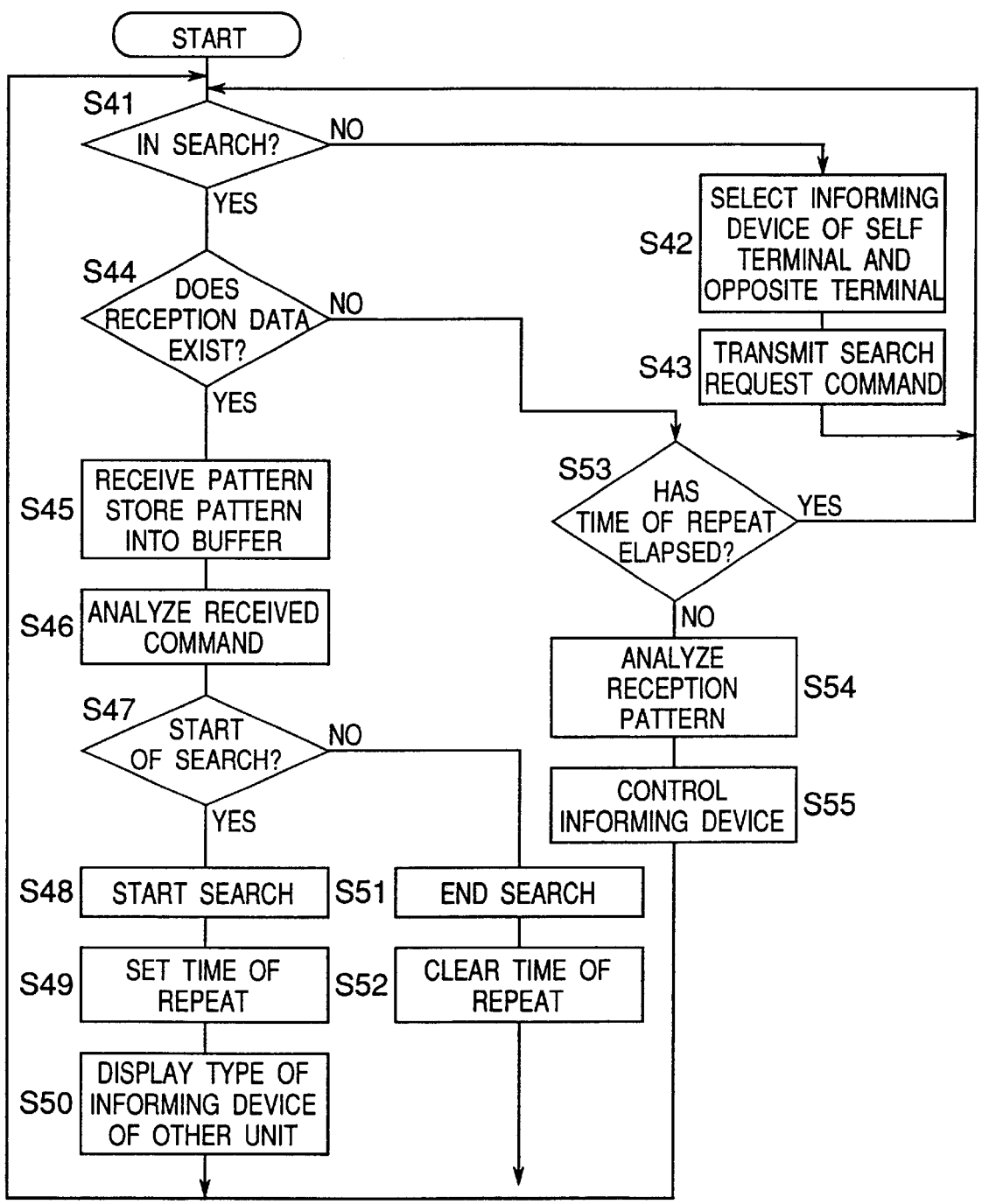
FIG. 13 is a chart of the operation sequence of a wireless communication unit that executes searching.
Figure 14:
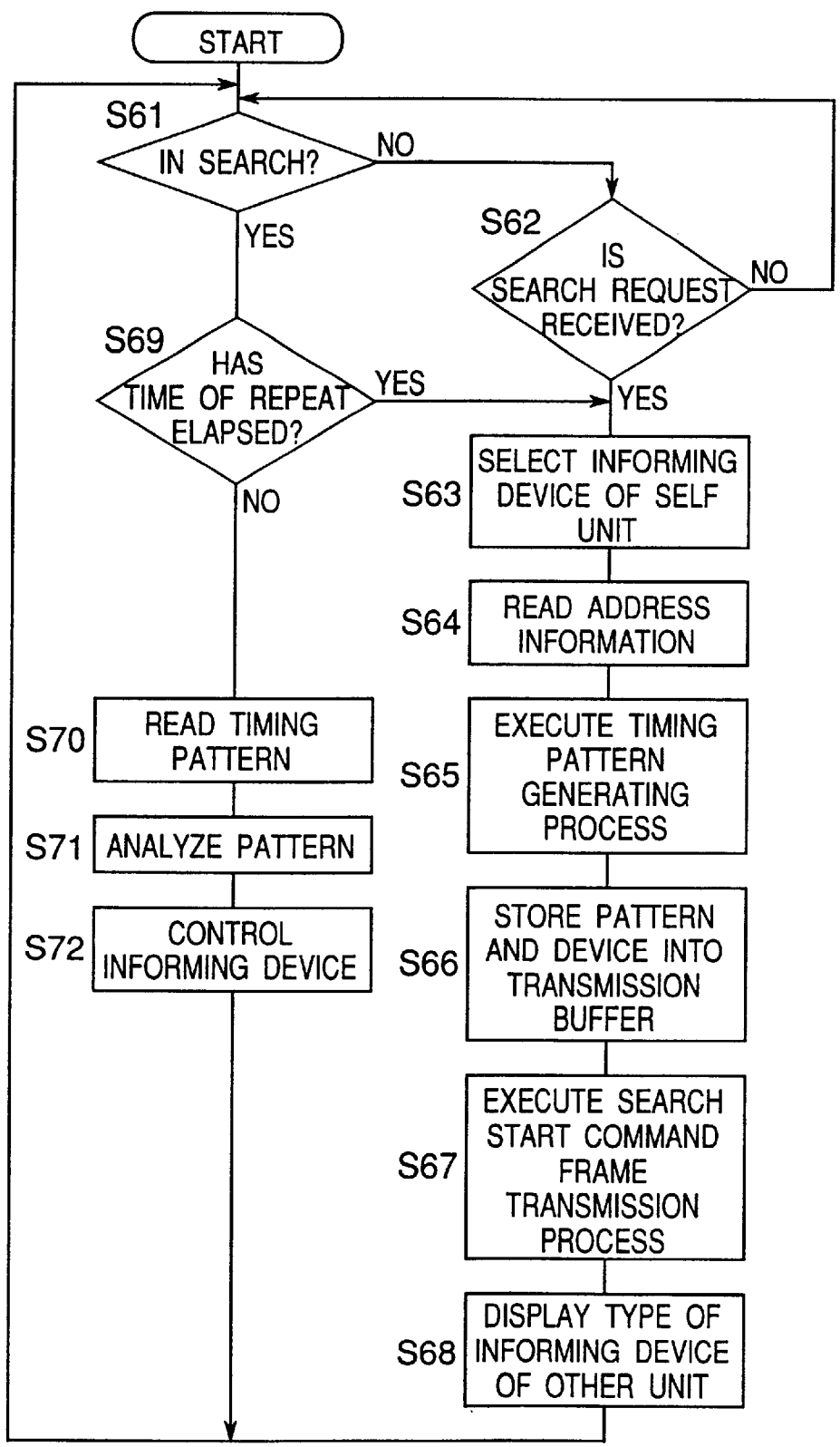
FIG. 14 is a chart of the operation sequence of a wireless communication unit to be searched.

Next, a procedure for executing positional detection in the wireless communication units A14, A24, An4 having the aforementioned construction will be described with reference to the operation sequence charts shown in FIG. 13 and FIG. 14. It is to be noted that FIG. 13 is the operation sequence chart of the wireless communication unit that executes searching and FIG. 14 is the operation sequence chart of the wireless communication unit to be searched. The following description is based on the assumption that the wireless communication unit that executes searching is defined as A14 and the wireless communication unit to be searched is defined as A24. It is to be noted that the reference numerals of the components constituting the opposite side wireless communication unit A24 are denoted by the same reference numerals as those of the components constituting the self side wireless communication unit A14.

If a non-directional wireless communication means such as an electric wave is used in a state in which the self side wireless communication unit A14 and the opposite side wireless communication unit A24 are communicating by means of the wireless communication control section 14, then the location of the opposite side wireless communication unit A24 cannot be recognized.

Accordingly, when searching the location of the opposite side wireless communication unit A24, the self side wireless communication unit A14 first confirms whether or not search is started (step S41). If the search is not started, the informing device (one of D1 through D3) to be used by the unit A14 and the informing device (one of D1 through D3) that is desired to be used by the opposite side wireless communication unit A24 are set to the search request command frame F14 by means of the wireless communication control section 14 (step S42) and transmitted to the opposite side wireless communication unit A24 (step S43).

When receiving the search request command frame F14 (when the affirmative decision of YES is made in step S62), the opposite side wireless communication unit A24 selects the informing device (one of D1 through D3) to be used according to the information of the "other unit device" included in the search request command frame F14 (step S63). Then, the unit A24 reads the physical address information 18a from the address storage section 18 (step S64) and generates a timing pattern (for example, the timing pattern 11a shown in FIG. 2) specific to the opposite side wireless communication unit A24 from the physical address information 18a in the timing pattern generating section 11 (step S65). Then, the unit A24 forms the search start command frame F24 including the generated timing pattern 11a and the type of the informing device that is determined to be used and stores the same into the transmission buffer 15 (step S66). Subsequently, the unit A24 transmits the search start command frame F24 stored in the transmission buffer 15 to the self side wireless communication unit A14 by the wireless communication control section 14 and displays the information of the "self unit device" included in the previously received search request command frame F14 by means of the display section 19 (step S68).

Concurrently, the opposite side wireless communication unit A24 confirms whether or not the time of repeat has elapsed (step S69), reads the timing pattern 11a generated in the timing pattern generating section 11 when the time has not elapsed (step S70), analyzes the read timing pattern 11a by means of the switch information table shown in FIG. 3A by the timing pattern analyzing section 12 (step S71) and controls the switch of the informing device (one of D1 through D3) that is determined to be used by the device selecting control section 134 according to the analyzed timing pattern (see FIG. 4A) (step S72).

When receiving the search start command frame F24 (when the affirmative decision of YES is made in step S44), the self side wireless communication unit A14 stores the received search start command frame F24 into the reception buffer 16 (step S45). If the timing pattern analyzing section 12 recognizes that the received command is the search start command frame F24 (when the affirmative decision of YES is made in step S47) as a result of analysis of the frame stored in the reception buffer 16 (step S46), then the unit A14 starts to search the opposite side wireless communication unit A24 (step S48), sets the data of the time of repeat included in the search start command frame F24 in the internal timer 17 (step S49) and displays on the display section 19 the type of the device that is determined to be used for the opposite side wireless communication unit A24 according to the information of the "self unit device" included in the search start command frame F24 (step S50). Subsequently, until this time of repeat elapses (when the affirmative decision of YES is made in step S53 via step S41 and step S44), the unit A14 analyzes the received timing pattern by means of the switch information table shown in FIG. 3A (step S54) and controls the switch of the informing device to be used for the self side wireless communication unit A14 previously determined in step S42 by the device selecting control section 134 according to the timing pattern (see FIG. 4A) (step S55).

By thus subjecting the informing device of the self side wireless communication unit A14 and the informing device of the opposite side wireless communication unit A22 to switching control in accordance with same timing, the user can easily search the location of the opposite side wireless communication unit A24 by the sense of sight, sense of hearing and sense of touch.

Sixth Embodiment

Figure 15:
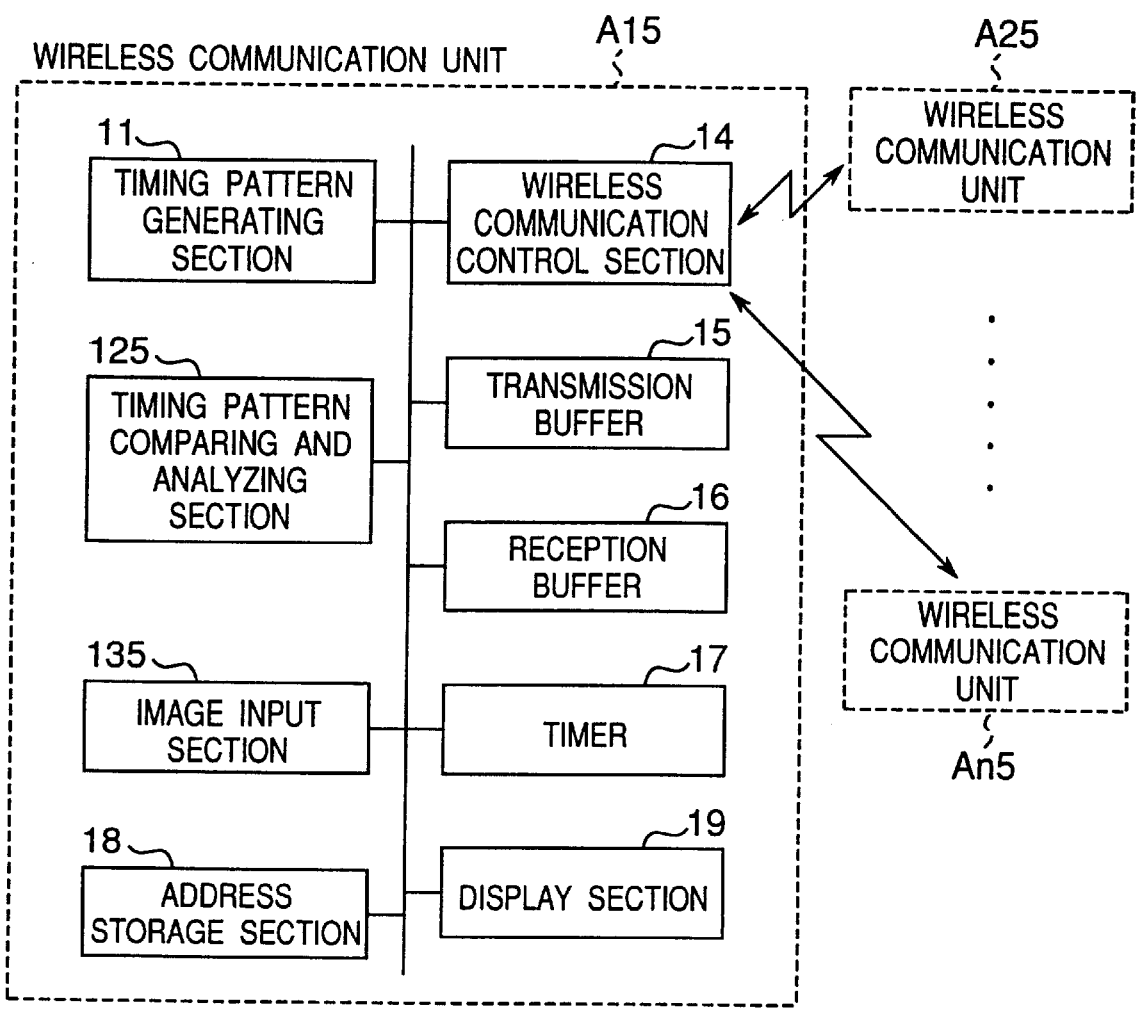
FIG. 15 is a block diagram showing the sixth embodiment of a wireless communication unit for putting the communication unit position detecting system of the present invention into practice.

FIG. 15 is a block diagram showing the sixth embodiment of a wireless communication unit for putting the communication unit position detecting system of the present invention into practice, corresponding to the claim 4.

In the figure are shown wireless communication units A15, A25, . . . , An5. There are shown a timing pattern generating section 11, a wireless communication control section 14, a transmission buffer 15, a reception buffer 16, a timer 17, an address storage section 18 and a display section 19. These components have constructions similar to those of the components shown in FIG. 11, and therefore, same reference numerals are given to these components with no detailed description provided for them. The reference numeral 135 denotes an image input section that employs a device of a camera or the like and serves as a concrete example of the informing device control section shown in FIG. 1. The reference numeral 125 denotes a timing pattern comparing and analyzing section that compares the timing pattern obtained by the image input section 135 with the timing pattern received from the opposite side wireless communication unit.

Figure 16:
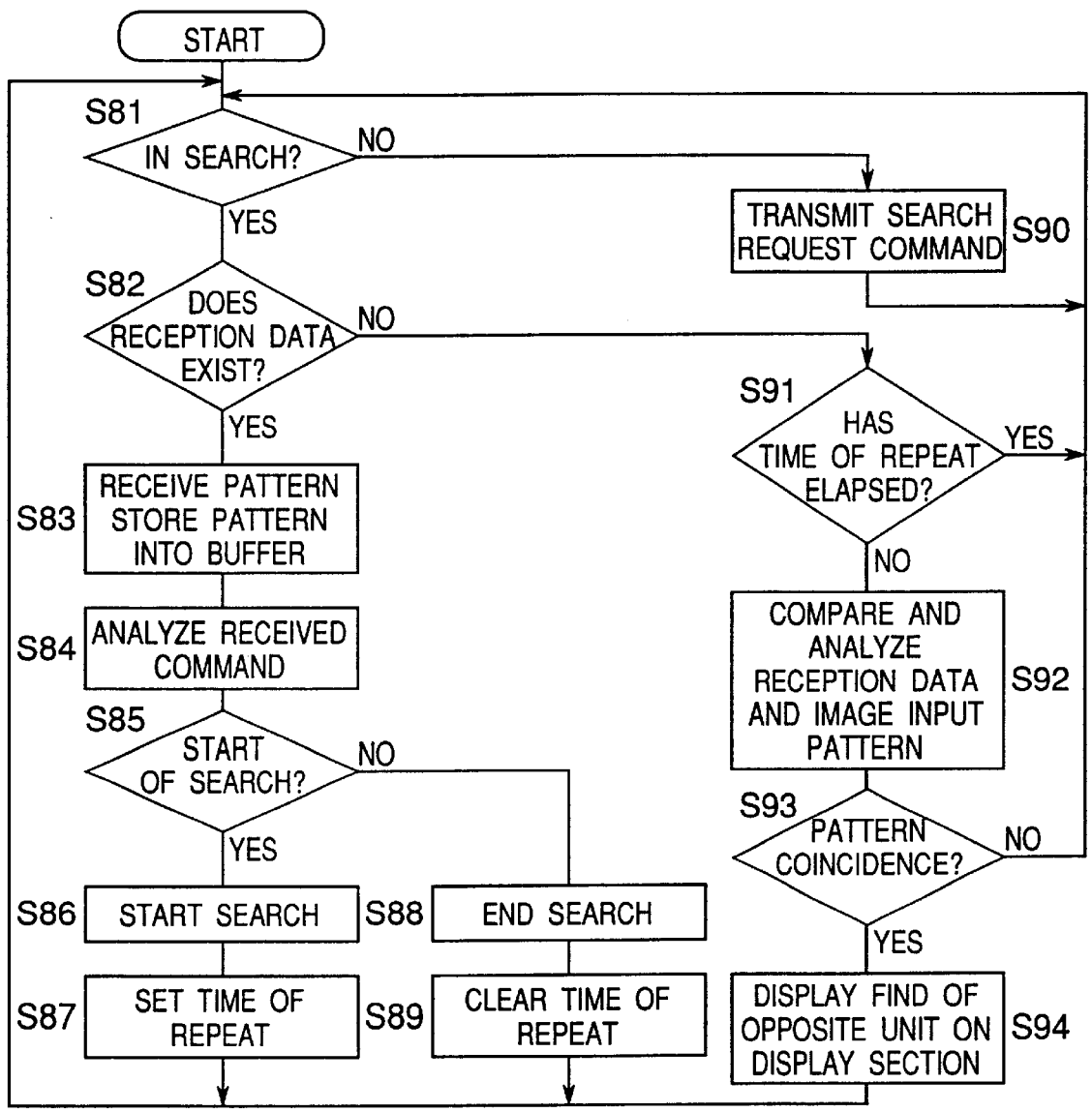
FIG. 16 is a chart of the operation sequence of a wireless communication unit that executes searching.

A procedure for executing positional detection with the wireless communication units A15, A25, . . . , An5 having the aforementioned construction will be described next with reference to the operation sequence charts shown in FIG. 16 and FIG. 7. It is to be noted that FIG. 16 is the operation sequence chart of the wireless communication unit that executes searching and FIG. 7 is the operation sequence chart of the wireless communication unit to be searched. FIG. 7 is used in the first embodiment. However, the sequence itself is similar in the present sixth embodiment, and therefore, the operations of the opposite side wireless communication unit will be described with reference to FIG.

7. The following description is based on the assumption that the self side wireless communication unit that executes searching is defined as A15 and the opposite side wireless communication unit to be searched is defined as A25. It is assumed that only the self side wireless communication unit A15 has the image input section 135 and the opposite side wireless communication unit A25 has the light emitting device control section 131 shown in FIG. 8. It is to be noted that the reference numerals of the components constituting the opposite side wireless communication unit A25 are denoted by the same reference numerals of the components constituting the self side wireless communication unit A15. The frame to be transmitted uses the frame format shown in FIGS. 5A through 5C.

If a non-directional wireless communication means such as an electric wave is used in a state in which the self side wireless communication unit A15 and the opposite side wireless communication unit A25 are communicating by means of the wireless communication control section 14, then the location of the opposite side wireless communication unit A25 cannot be recognized.

Accordingly, when searching the location of the opposite side wireless communication unit A25, the self side wireless communication unit A15 first confirms whether or not search is started (step S81). If the search is not started, then the unit A15 transmits the search request command frame F1 to the opposite side wireless communication unit A25 by the wireless communication control section 14 (step S90).

When receiving the search request command frame F1 (when a affirmative decision of YES is made in step S22), the opposite side wireless communication unit A25 reads the physical address information 18a from the address storage section 18 (step S23) and generates a timing pattern (for example, the timing pattern 11a shown in FIG. 2) specific to the opposite side wireless communication unit A25 from the physical address information 18a in the timing pattern generating section 11 (step S24). Then, the unit A25 forms the search start command frame F2 from the generated timing pattern 11a and stores the same into the transmission buffer 15 (step S25). Subsequently, the unit A25 transmits the search start command frame F2 stored in the transmission buffer 15 to the self side wireless communication unit A15 by the wireless communication control section 14 (step S26).

Concurrently, the opposite side wireless communication unit A25 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and controls the switch of the light emitting device such as an LCD or a lamp according to the analyzed timing pattern (see FIG. 4A) by means of the light emitting device control section 131 so as to flash the device (step S30).

When receiving the search start command frame F2 (when the affirmative decision of YES is made in step S82), the self side wireless communication unit A15 stores the received search start command frame F2 into the reception buffer 16 (step S83). If the timing pattern analyzing section 12 recognizes that the received command is the search start command frame F2 (when the affirmative decision of YES is made in step S85) as a result of analysis of the frame stored in the reception buffer 16 (step S84), then the unit A15 starts to search the opposite side wireless communication unit A25 (step S86) and sets the data of the time of repeat included in the search start command frame F2 in the internal timer 17 (step S87). Subsequently, until this time of repeat elapses (when the affirmative decision of YES is made in step S91 via step S81 and step S82), the unit A15 analyzes the received timing pattern and the timing pattern obtained from the image input section 135 by means of the switch information table shown in FIG. 3A (step S92) and informs the user of the event that the opposite side wireless communication unit A25 is found when the patterns coincide with each other (when the affirmative decision of YES is made in step S93) by displaying the event on the display section 19 (step S94).

By thus detecting the flashing pattern of the light emitting device of the lamp or the like of the opposite side wireless communication unit A25 by means of the image input section 135 of a camera or the like on the self side and executing informing, the location of the opposite side wireless communication unit A25 can be automatically searched.

Seventh Embodiment

Figure 17:
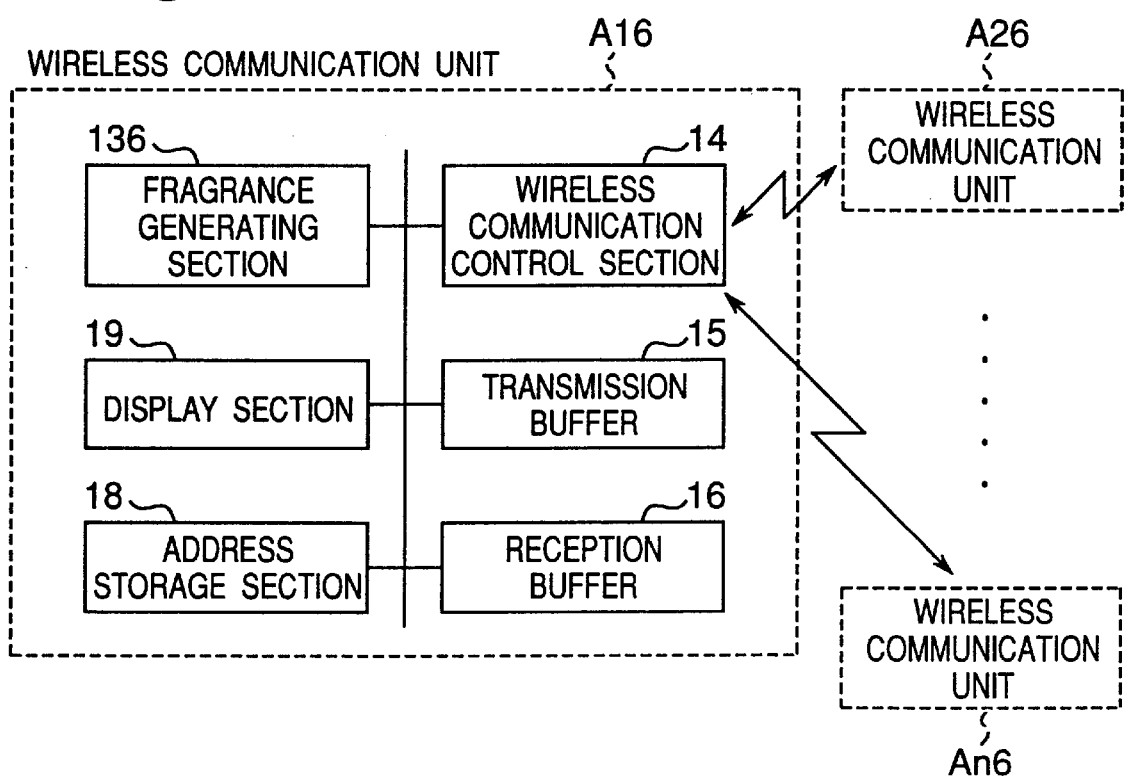
FIG. 17 is a block diagram showing the seventh embodiment of a wireless communication unit for putting the communication unit position detecting system of the present invention into practice.

FIG. 17 is a block diagram showing the seventh embodiment of a wireless communication unit for putting the wireless communication unit position detecting system of the present invention into practice, corresponding to the claim 5.

In the figure are shown wireless communication units A16, A26, . . . , An6. There are shown a wireless communication control section 14, a transmission buffer 15, a reception buffer 16, an address storage section 18 and a display section 19. These components have constructions similar to those of the components shown in FIG. 11, and therefore, same reference numerals are given to these components with no detailed description provided for them. The reference numeral 136 denotes a fragrance generating section that generates a fragrance of a specified type and serves as a concrete example of the informing device control section shown in FIG. 1. The display section 19 displays the type of the fragrance generated by the opposite side wireless communication unit.

Figure 18A:
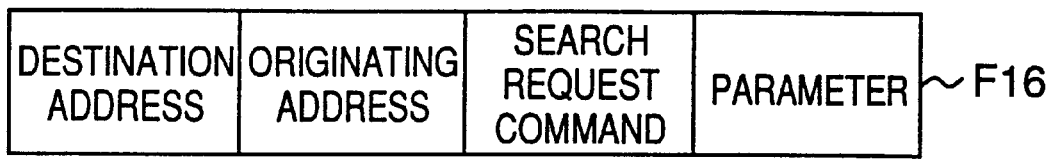
FIGS. 18A through 18C are schematic charts of frames for use in transmitting a timing pattern of positional detection.
Figure 18B:
Figure 18C:
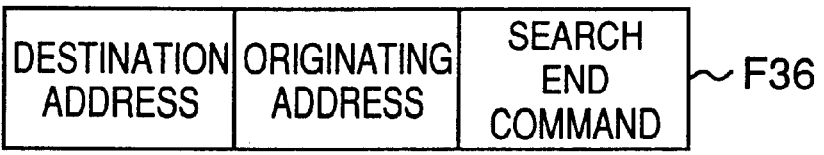

FIGS. 18A through 18C are schematic charts of frames for use in transmitting a timing pattern of positional detection. That is, when issuing a positional detection request at the start of positional detection, a search request command frame F16 having the format shown in FIG. 18A is used. At an informing device operation start time for positional detection, a search start command frame F26 having the format shown in FIG. 18B is used. At an informing device operation end time, a search end command frame F36 shown in FIG. 18C is used. A difference between the search request command frame F16 shown in FIG. 18A and the search request command frame F1 shown in FIG. 5A is that a parameter representing the type of the fragrance that is desired to be generated is added for the search request command frame F16. Likewise, a difference between the search start command frame F26 shown in FIG. 18B and the search start command frame F2 shown in FIG. 5B is that a parameter representing the type of the fragrance generated in the opposite side wireless communication unit is added for the search start command frame F26. It is to be noted that the fragrance information table for analyzing the type of the fragrance has already been shown in FIG. 3D.

Next, a procedure for executing positional detection in the wireless communication units A16, A26, . . . , An6 having the aforementioned construction will be described with reference to the operation sequence charts shown in FIG. 19.

Figure 19:
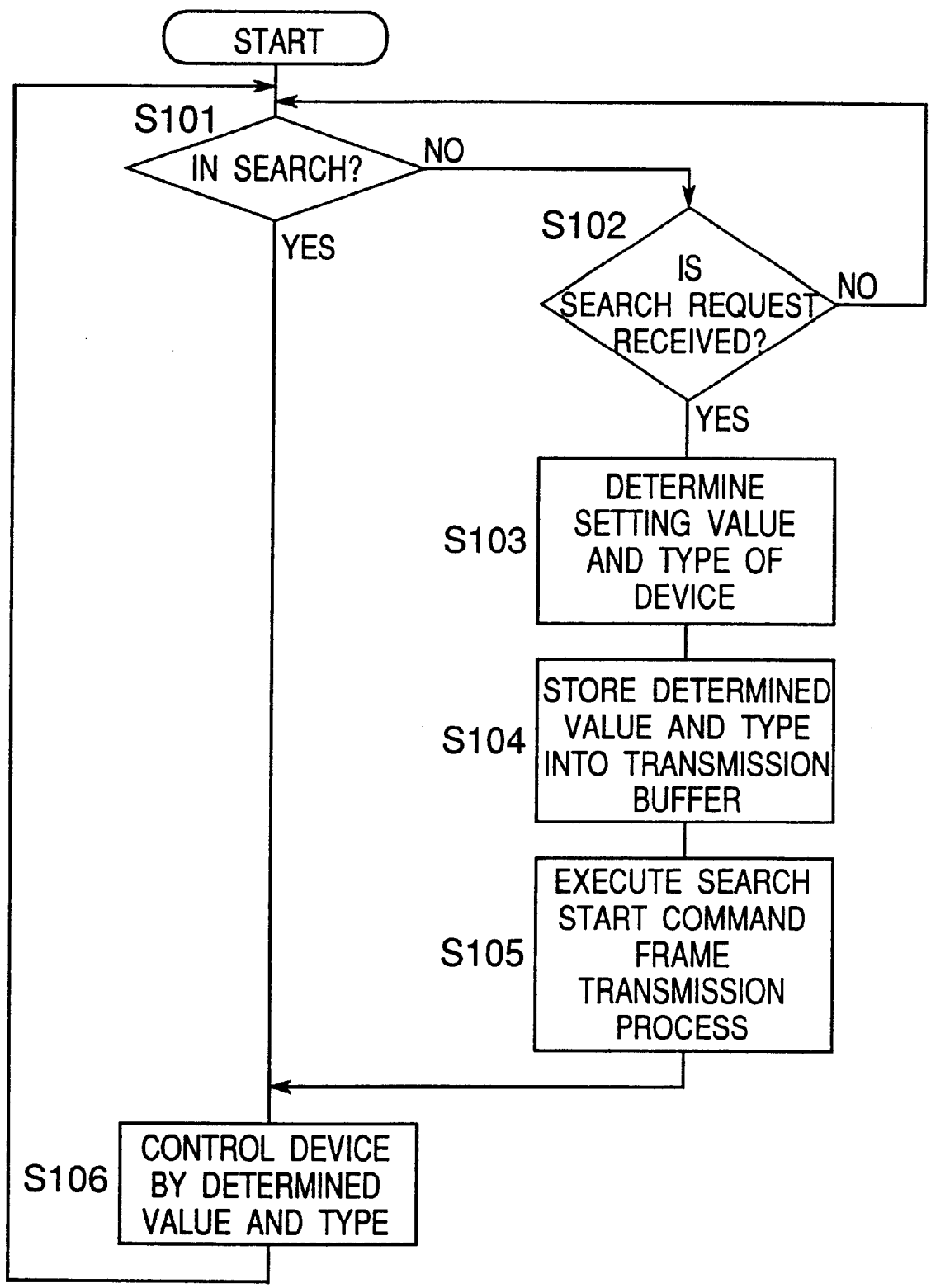
FIG. 19 is a chart of the operation sequence of a wireless communication unit to be searched.

It is to be noted that FIG. 19 is the operation sequence chart of the wireless communication unit to be searched. The following description is based on the assumption that the wireless communication unit that executes searching is defined as A16 and the wireless communication unit to be searched is defined as A26. It is to be noted that the reference numerals of the components constituting the opposite side wireless communication unit A26 are denoted by the same reference numerals as those of the components constituting the self side wireless communication unit A16.

If a non-directional wireless communication means such as an electric wave is used in a state in which the self side wireless communication unit A16 and the opposite side wireless communication unit A26 are communicating by means of the wireless communication control section 14, then the location of the opposite side wireless communication unit A26 cannot be recognized.

Accordingly, when searching the location of the opposite side wireless communication unit A26, the self side wireless communication unit A16 first confirms whether or not search is started. If the search is not started, the unit A16 transmits the search request command frame F16 including the type of the fragrance that is desired to be generated to the opposite side wireless communication unit A26 by the wireless communication control section 14.

When receiving the search request command frame F16 (when the affirmative decision of YES is made in step S102), the opposite side wireless communication unit A26 determines the type of the fragrance that can be generated according to the parameter information included in the search request command frame F16 (step S103), forms a search start command frame F26 as a parameter in correspondence with the fragrance information table that shows the type of fragrance to be generated in FIG. 3D and stores the same into the transmission buffer 15 (step S104). Subsequently, the unit A26 transmits the search start command frame F26 stored in the transmission buffer 15 to the self side wireless communication unit A16 by the wireless communication control section 14 (step S105). Subsequently, the fragrance of the type determined by the fragrance generating section 136 is generated (step S106).

The self side wireless communication unit A16 stores the received search start command frame F26 into the reception buffer 16 and analyzes the stored search start command. Upon recognizing the search start command frame F26, the unit A16 analyzes the type of the fragrance of the parameter information included in the search start command frame F26 by means of the fragrance information table shown in FIG. 3D and informs the user of the result of analysis by displaying the same on the display section 19.

By thus generating an arbitrary fragrance from the opposite side wireless communication unit A26 and informing the self side wireless communication unit A16 of the type of the generated fragrance, the user can search the location of the opposite side wireless communication unit A26 by the sense of smell.

Eighth Embodiment

Figure 20:
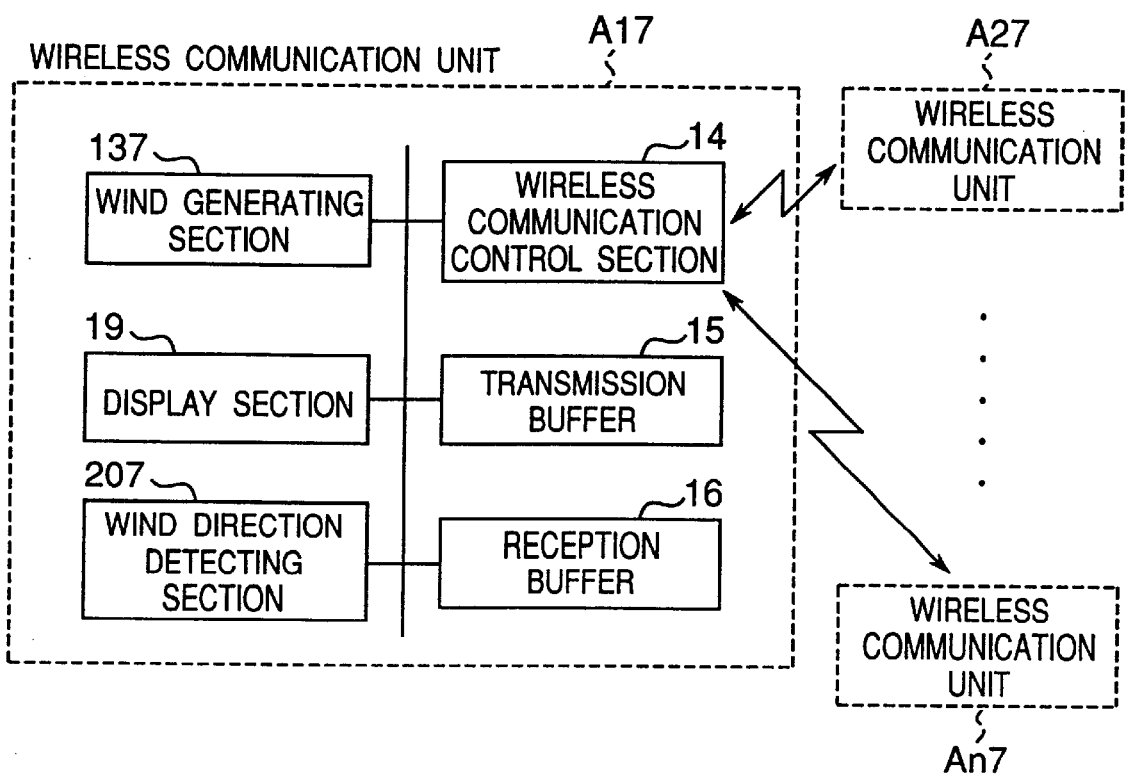
FIG. 20 is a block diagram showing the eighth embodiment of a wireless communication unit for putting the communication unit position detecting system of the present invention into practice.

FIG. 20 is a block diagram showing the eighth embodiment of a wireless communication unit for putting the communication unit position detecting system of the present invention into practice, corresponding to the claim 6 and claim 7.

In the figure are shown wireless communication units A17, A27, . . . , An7. There are shown a wireless communication control section 14, a transmission buffer 15, a reception buffer 16 and a display section 19. These components have constructions similar to those of the components shown in FIG. 11, and therefore, same reference numerals are given to these components with no detailed description provided for them. The reference numeral 137 denotes a wind generating section that generates wind of an arbitrary strength and direction and serves as a concrete example of the informing device control section shown in FIG. 1. The reference numeral 207 denotes a wind direction detecting section (wind generating source direction detecting means) employing a device of an anemoscope or the like.

Figure 21:
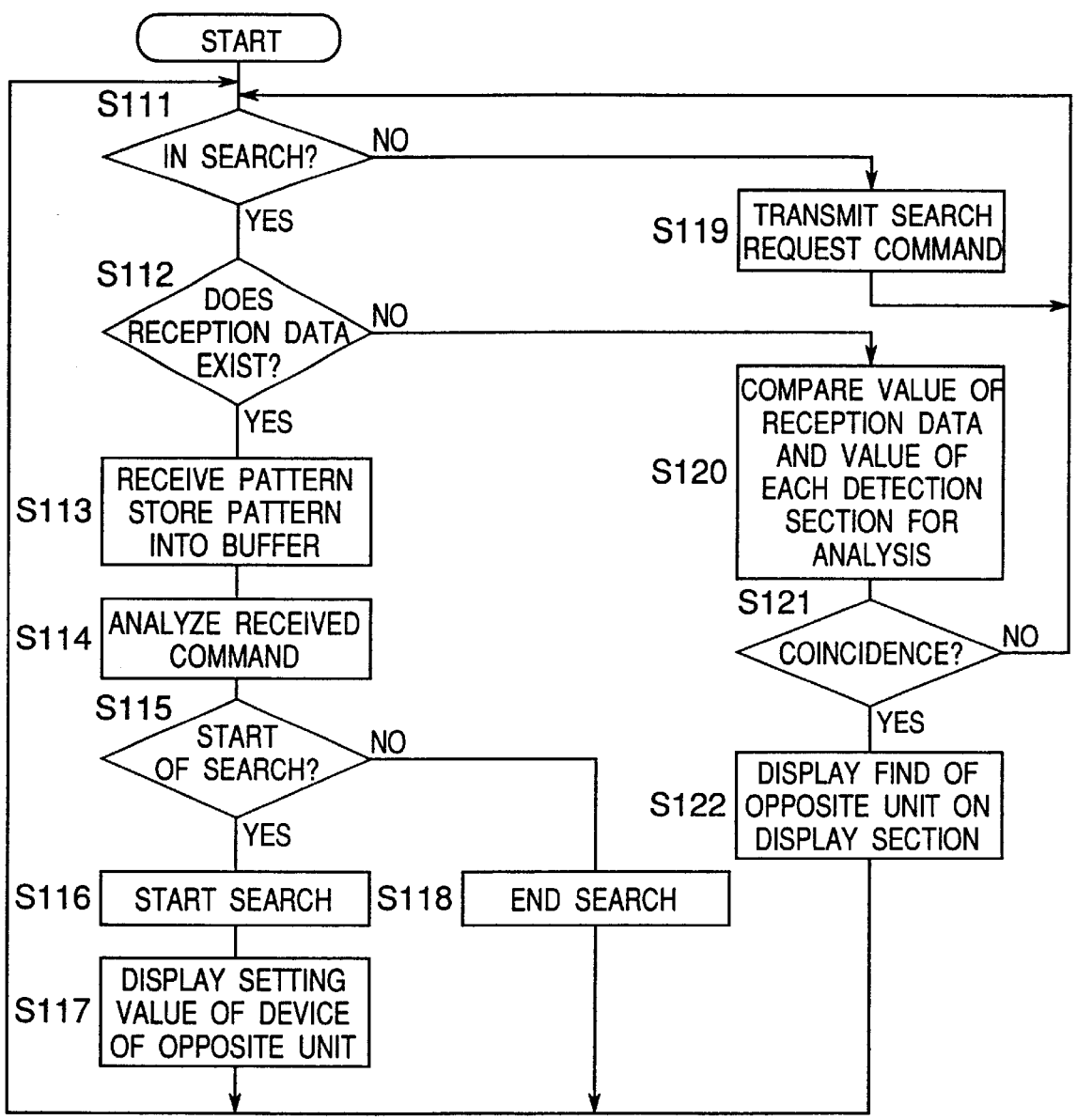
FIG. 21 is a chart of the operation sequence of a wireless communication unit that executes searching.

A procedure for executing positional detection with the wireless communication units A17, A27, . . . , An7 having the aforementioned construction will be described next with reference to the operation sequence charts shown in FIG. 21 and FIG. 19. It is to be noted that FIG. 21 is the operation sequence chart of the wireless communication unit that executes searching and FIG. 19 is the operation sequence chart of the wireless communication unit to be searched. FIG. 19 is used in the sixth embodiment. However, the sequence itself is similar in the present eighth embodiment, and therefore, the operations of the opposite side wireless communication unit will be described with reference to FIG. 19. The following description is based on the assumption that the self side wireless communication unit that executes searching is defined as A17 and the opposite side wireless communication unit to be searched is defined as A27. It is to be noted that the reference numerals of the components constituting the opposite side wireless communication unit A27 are denoted by the same reference numerals of the components constituting the self side wireless communication unit A17. The frame to be transmitted is similar to that shown in FIGS. 18A through 18C, and therefore, the description will be done with reference to the frame format shown in FIGS. 18A through 18C.

If the self side wireless communication unit A17 and the opposite side wireless communication unit A27 are communicating by means of the wireless communication control section 14, then the location of the opposite side wireless communication unit A27 cannot be recognized.

Accordingly, when searching the location of the opposite side wireless communication unit A27, the self side wireless communication unit A17 first confirms whether or not search is started (step S111). If the search is not started, the unit A17 transmits a search request command frame F16 including the setting value of the strength, direction and so on of wind that is desired to be generated in a parameter corresponding to the wind force information table shown in FIG. 3E to the opposite side wireless communication unit A27 by the wireless communication control section 14.

When receiving the search request command frame F16 (when the affirmative decision of YES is made in step S102), the opposite side wireless communication unit A27 determines the strength, direction and so on of wind that can be generated by analyzing the parameter information included in the search request command frame F16 by means of the wind force information table shown in FIG. 3E (step S103), forms a search start command frame F26 as a parameter obtained by making the strength, direction and so on of wind to be generated correspond to the wind force information table shown in FIG. 3E and stores the same into the transmission buffer 15 (step S104). Subsequently, the unit A27 transmits the search start command frame F26 stored in the transmission buffer 15 to the self side wireless communication unit A17 by the wireless communication control section 14 (step S105). Subsequently, the unit A27 generates a wind of the strength, direction and so on determined by the wind generating section 137 (step S106).

When receiving the search start command frame F26 (when the affirmative decision of YES is made in step S112), the self side wireless communication unit A17 stores the received search start command frame F26 into the reception buffer 16 (step S113). Then, the unit A17 analyzes the stored search start command frame (step S114). Upon recognizing the search start command frame F26, the unit A17 starts searching the opposite side wireless communication unit A27 (step S116), analyzes the information of the strength, direction and so on of wind of the parameter information included in the search start command frame F26 by means of the wind force information table shown in FIG. 3E and informs the user of the result of analysis by displaying the same on the screen of the display section 19 (step S117).

Subsequently, the operation proceeds from step S111 and step S112 to step S120 so as to make the unit A17 compare the received information of the strength, direction and so on of wind generated from the opposite side wireless communication unit A27 with the information obtained from the wind direction detecting section 207 of an anemoscope or the like and analyze the same. If coincidence occurs (when the affirmative decision of YES is made in step S121), then the unit A17 displays on the display section 19 the information representing the event that the opposite side wireless communication unit A27 is found, informing the user of the event (step S122).

By thus generating a wind of arbitrary strength and direction from the opposite side wireless communication unit A27 and informing the self side wireless communication unit A17 of the setting value, the user can search the location of the opposite side wireless communication unit A27 by the sense of touch. Furthermore, by providing the self side wireless communication unit A17 with the wind direction detecting section 207 of an anemoscope or the like, the opposite side wireless communication unit A27 can be automatically searched.

Ninth Embodiment

Figure 22:
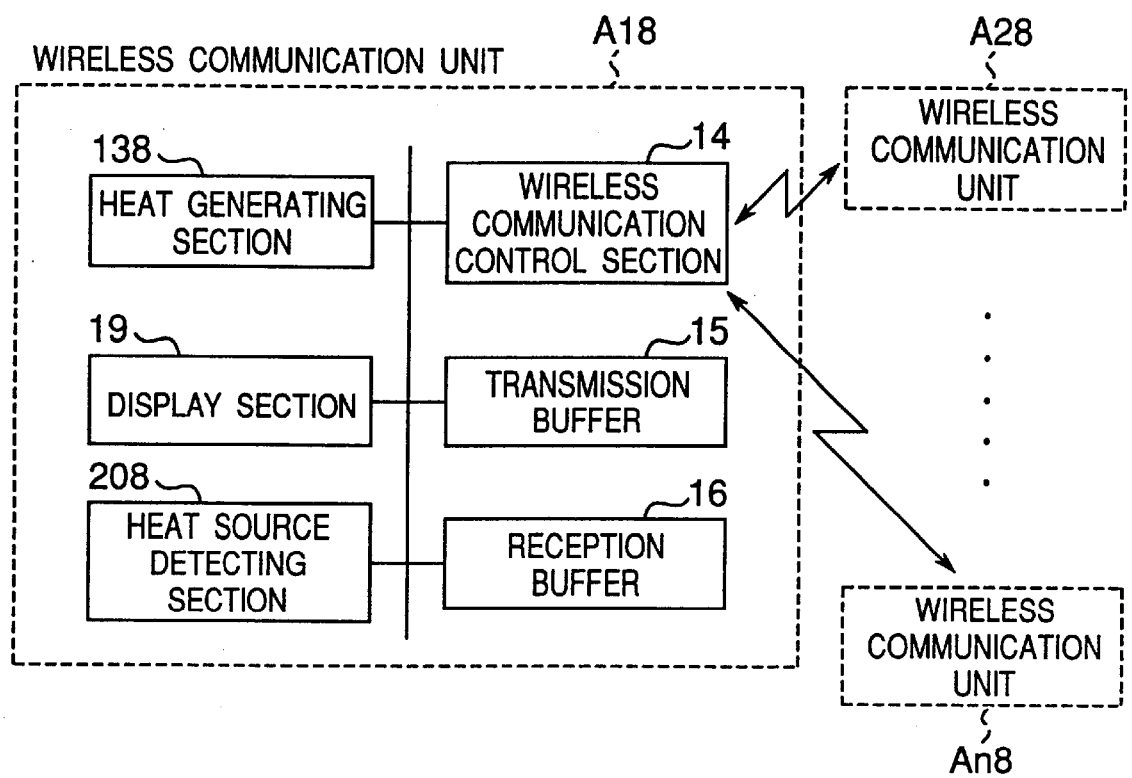
FIG. 22 is a block diagram showing the ninth embodiment of a wireless communication unit for putting the communication unit position detecting system of the present invention into practice.

FIG. 22 is a block diagram showing the ninth embodiment of a wireless communication unit for putting the wireless communication unit position detecting system of the present invention into practice, corresponding to the claim 8 and claim 9.

In the figure are shown wireless communication units A18, A28, . . . , An8. There are shown a wireless communication control section 14, a transmission buffer 15, a reception buffer 16 and a display section 19. These components have constructions similar to those of the components shown in FIG. 11, and therefore, same reference numerals are given to these components with no detailed description provided for them. The reference numeral 138 denotes a heat generating section that generates heat of an arbitrary temperature and serves as a concrete example of the informing device control section shown in FIG. 1. The reference numeral 208 denotes a heat source detecting section (heat source detection detecting means) that can detect the temperature.

A procedure for executing positional detection with the wireless communication units A18, A28, . . . , An8 having the aforementioned construction will be described next with reference to the operation sequence charts shown in FIG. 21 and FIG. 19. It is to be noted that FIG. 21 is the operation sequence chart of the wireless communication unit that executes searching and FIG. 19 is the operation sequence chart of the wireless communication unit to be searched. FIG. 21 and FIG. 19 are used in the eighth embodiment.

However, the sequence itself is similar in the present ninth embodiment, and therefore, the operations of the self side wireless communication unit and the opposite side wireless communication unit will be described with reference to FIG. 21 and FIG. 19. The following description is based on the assumption that the self side wireless communication unit that executes searching is defined as A18 and the opposite side wireless communication unit to be searched is defined as A28. It is to be noted that the reference numerals of the components constituting the opposite side wireless communication unit A28 are denoted by the same reference numerals of the components constituting the self side wireless communication unit A18. The frame to be transmitted is similar to that shown in FIGS. 18A through 18C, and therefore, the description will be done with reference to the frame format shown in FIGS. 18A through 18C.

If a non-directional wireless communication means such as an electric wave is used in a state in which the self side wireless communication unit A18 and the opposite side wireless communication unit A28 are communicating by means of the wireless communication control section 14, then the location of the opposite side wireless communication unit A28 cannot be recognized.

Accordingly, when searching the location of the opposite side wireless communication unit A28, the self side wireless communication unit A18 first confirms whether or not search is started (step S111). If the search is not started, the unit A18 transmits a search request command frame F16 in which the temperature of heat that is desired to be generated is included in a parameter in correspondence with the temperature information table shown in FIG. 3F to the opposite side wireless communication unit A28 by the wireless communication control section 14.

When receiving the search request command frame F16 (when the affirmative decision of YES is made in step S102), the opposite side wireless communication unit A28 determines the temperature of heat that can be generated by analyzing the parameter information included in the search request command frame F16 by means of the temperature information table shown in FIG. 3F (step S103), forms a search start command frame F26 as a parameter obtained by making the determined heat temperature correspond to the temperature information table shown in FIG. 3F and stores the same into the transmission buffer 15 (step S104). Subsequently, the unit A28 transmits the search start command frame F26 stored in the transmission buffer 15 to the self side wireless communication unit A18 by the wireless communication control section 14 (step S105). Subsequently, the unit A28 generates heat of the temperature determined by the heat generating section 138 (step S106).

When receiving the search start command frame F26 (when the affirmative decision of YES is made in step S112), the self side wireless communication unit A18 stores the received search start command frame F26 into the reception buffer 16 (step S113). Then, the unit A18 analyzes the stored search start command (step S114). Upon recognizing the search start command frame F26, the unit A18 starts searching the opposite side wireless communication unit A28 (step S116), analyzes the parameter information included in the search start command frame F26 by means of the temperature information table shown in FIG. 3F and informs the user of the result of analysis by displaying the same on the screen of the display section 19 (step S117).

Subsequently, the operation proceeds from step S111 and step S112 to step S120 so as to make the unit A18 compare the received information of the temperature of heat generated from the opposite side wireless communication unit A28 with the information obtained from the heat source detecting section 208. If coincidence occurs (when the affirmative decision of YES is made in step S121), then the unit A18 displays on the display section 19 information representing the event that the opposite side wireless communication unit A28 is found, informing the user of the event (step S122).

By thus generating heat of an arbitrary temperature from the opposite side wireless communication unit A28 and informing the self side wireless communication unit A18 of the setting value, the user can search the location of the opposite side wireless communication unit A28 by the sense of touch. Furthermore, by providing the self side wireless communication unit A18 with a heat detecting section 208, the opposite side wireless communication unit A28 can be automatically searched.

Tenth Embodiment

Figure 23:
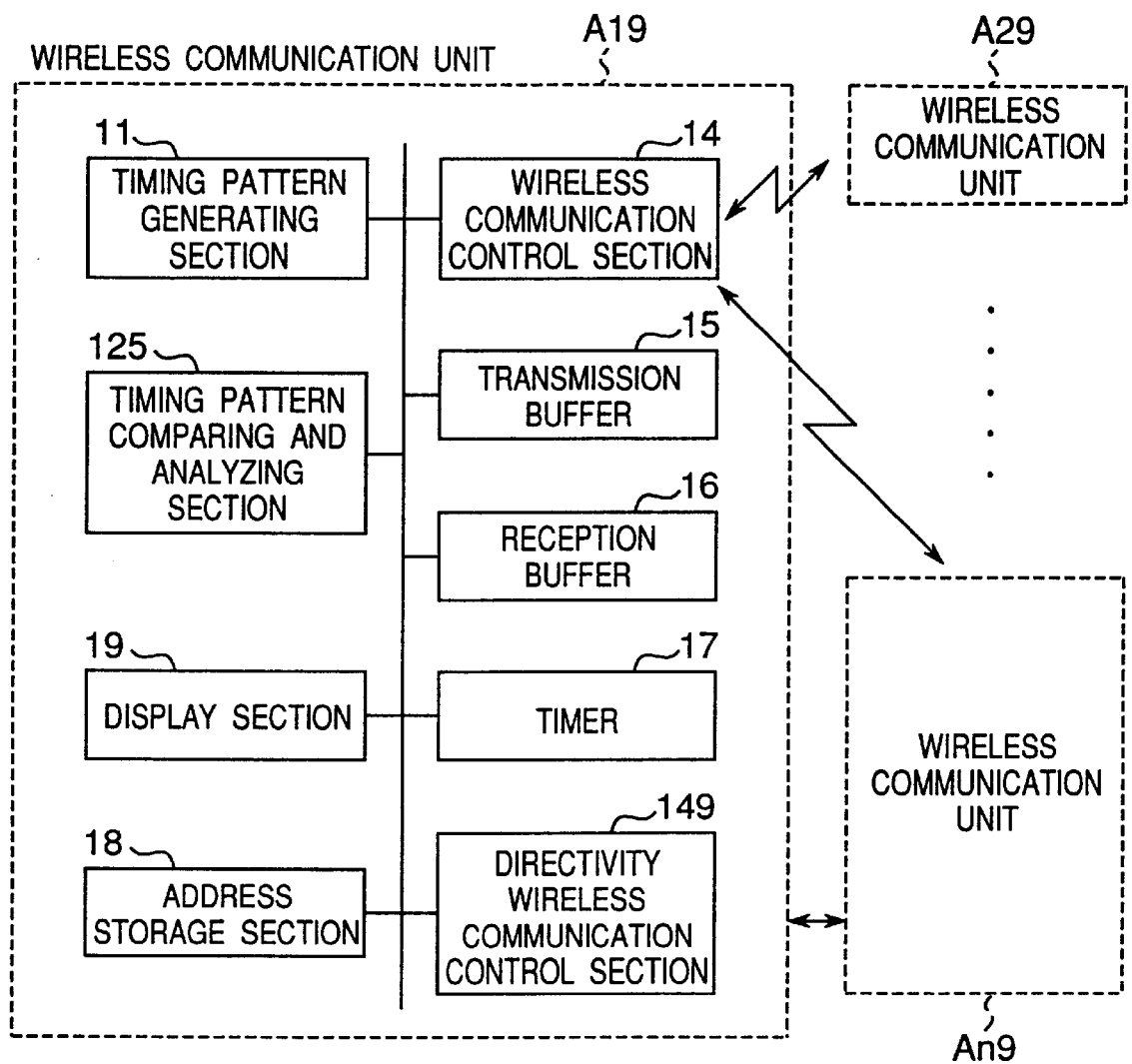
FIG. 23 is a block diagram showing the tenth embodiment of a wireless communication unit for putting the communication unit position detecting system of the present invention into practice.

FIG. 23 is a block diagram showing the tenth embodiment of a wireless communication unit for putting the wireless communication unit position detecting system of the present invention into practice, corresponding to the claim 10.

In the figure are shown wireless communication units A19, A29, . . . , An9. There are shown a timing pattern generating section 11, a wireless communication control section 14 (first wireless communication means), a transmission buffer 15, a reception buffer 16, a timer 17, an address storage section 18 and a display section 19. The reference numeral 125 denotes a timing pattern comparing and analyzing section. These components have constructions similar to those of the components shown in FIG. 15, and therefore, same reference numerals are given to the components with no detailed description provided for them. The reference numeral 149 denotes a non-directional wireless communication control section (second wireless communication means) employing a device of infrared ray IR, laser, ultrashort wave or the like.

Figure 24:
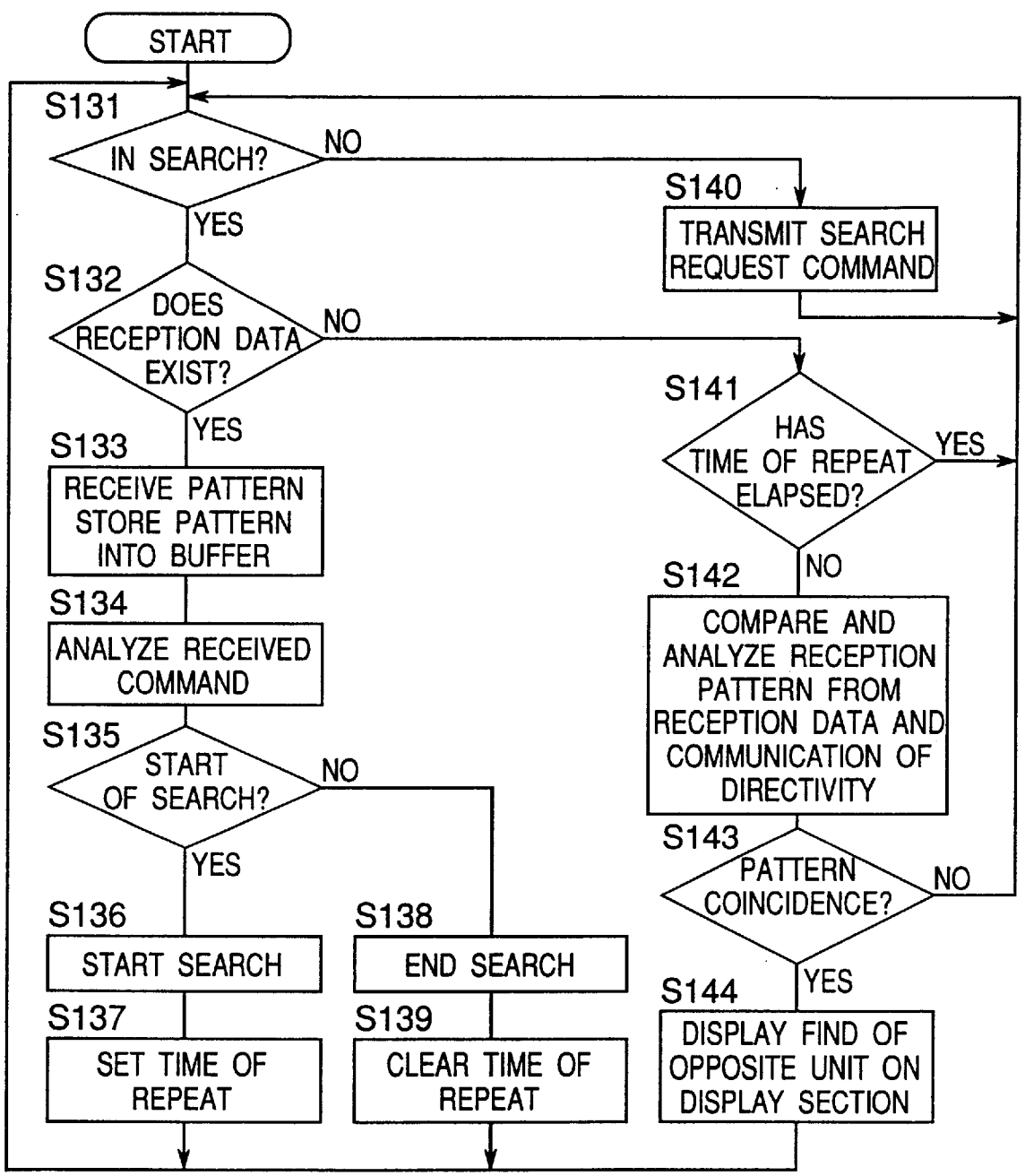
FIG. 24 is a chart of the operation sequence of a wireless communication unit that executes searching.

A procedure for executing positional detection with the wireless communication units A19, A29, . . . , An9 having the aforementioned construction will be described next with reference to the operation sequence charts shown in FIG. 24 and FIG. 7. It is to be noted that FIG. 24 is the operation sequence chart of the wireless communication unit that executes searching and FIG. 7 is the operation sequence chart of the wireless communication unit to be searched. FIG. 7 is used in the first embodiment. However, the sequence itself is similar in the present tenth embodiment, and therefore, the operations of the opposite side wireless communication unit will be described with reference to FIG. 7. The following description is based on the assumption that the self side wireless communication unit that executes searching is defined as A19 and the opposite side wireless communication unit to be searched is defined as An9. It is to be noted that the reference numerals of the components constituting the opposite side wireless communication unit An9 are denoted by the same reference numerals of the components constituting the self side wireless communication unit A19. The frame to be transmitted uses the frame format shown in FIGS. 5A through 5C.

If a non-directional wireless communication means such as an electric wave is used in a state in which the self side wireless communication unit A19 and the opposite side wireless communication unit An9 are communicating by means of the wireless communication control section 14, then the location of the opposite side wireless communication unit An9 cannot be recognized.

Accordingly, when searching the location of the opposite side wireless communication unit An9, the self side wireless communication unit A19 first confirms whether or not search is started (step S131). If the search is not started, then the unit A19 transmits the search request command frame F1 to the opposite side wireless communication unit An9 by the wireless communication control section 14 (step S140).

When receiving the search request command frame F1 (when a affirmative decision of YES is made in step S22), the opposite side wireless communication unit An9 reads the physical address information 18a from the address storage section 18 (step S23) and generates a timing pattern (for example, the timing pattern 11a shown in FIG. 2) specific to the opposite side wireless communication unit An9 from the physical address information 18a in the timing pattern generating section 11 (step S24). Then, the unit An9 forms the search start command frame F2 from the generated timing pattern 11a and stores the same into the transmission buffer 15 (step S25). Subsequently, the unit An9 transmits the search start command frame F2 stored in the transmission buffer 15 to the self side wireless communication unit A19 by the wireless communication control section 14 (step S26).

Concurrently, the opposite side wireless communication unit An9 confirms whether or not the time of repeat has elapsed (step S27) and reads the timing pattern 11a in the timing pattern generating section 11 when the time has not elapsed (step S28), analyzes the read timing pattern 11a in the timing pattern analyzing section 12 by means of the switch information table shown in FIG. 3A (step S29) and executes transmission according to the analyzed timing pattern (see FIG. 4A) from the directional communication control section 149 (step S30).

When receiving the search start command frame F2 (when the affirmative decision of YES is made in step S132), the self side wireless communication unit A19 stores the received search start command frame F2 into the reception buffer 16 (step S133). If the timing pattern analyzing section 12 recognizes that the received command is the search start command frame F2 (when the affirmative decision of YES is made in step S135) as a result of analysis of the frame stored in the reception buffer 16 (step S134), then the unit A19 starts to search the opposite side wireless communication unit An9 (step S136) and sets the data of the time of repeat included in the search start command frame F2 in the internal timer 17 (step S137). Subsequently, until this time of repeat elapses (when the affirmative decision of YES is made in step S141 via step S131 and step S132), the unit A19 compares the timing pattern received by the non-directional wireless communication control section 149 with the timing pattern received by the directional wireless communication control section 149 for analysis (step S142) and informs the user of the event that the opposite side wireless communication unit An9 is found by displaying the event on the display section 19 when the pattern coincidence occurs (when the affirmative decision of YES is made in step S143) (step S144).

By thus comparing the timing pattern received by the non-directional wireless communication control section 14 with the timing pattern received by the directional wireless communication control section 149 in the self side wireless communication unit A19, the location of the opposite side wireless communication unit An9 can be automatically searched.

In each of the communication units constituting the communication unit position detecting system described in connection with the first through tenth embodiments, the positional detection processing of each unit is put into practice by a program stored in the unit. This program is stored in a recording medium that can be read by a computer. In the present invention, this recording medium is not shown (not shown in the block diagrams of the wireless communication systems of FIGS. 1, 8, 9, 10, 11, 15, 17, 20, 22 and 23). However, it is acceptable to internally provide the wireless communication unit with a program medium reading device (not shown) and allow the program medium to be read by inserting a recording medium into the device. Otherwise, it is acceptable to store the program in a storage means (not shown) such as a program memory provided inside the wireless communication unit. The stored program may have a construction to be executed by making direct access to the program in either case. Otherwise, it is acceptable to execute the program by reading the program and downloading the read program into a main memory (not shown) in either case. It is to be noted that this program for downloading use is preparatorily stored in the main body of the unit.

In this case, the aforementioned program medium may be a recording medium that can be removed from the main body and is provided by any of the media that carry the program in a fixed form including tape-based media of a magnetic tape, a cassette tape and the like, disk-based media of magnetic disks of a floppy disk, a hard disk and the like and optical disks of CD-ROM, MO, MD, DVD and the like and semiconductor-memory-based media of mask ROM, EPROM, EEPROM, flash ROM and the like.

The present invention is provided with a means (a wireless communication function or a wired communication function by way of a public line of internet or the like (not shown)) capable of communicating with the external devices. Therefore, the medium may connect with the external devices by this means and carry a program in a fluidic manner by downloading the program.

When downloading the program from the communication network as described above, a program for downloading the aforementioned program may be preparatorily stored in the main body of the unit or installed from another recording medium. The contents stored in the recording medium is not limited to a program but allowed to be data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication unit position detecting system having a plurality of communication units connected to one another by way of a wireless network, wherein one communication unit comprises a wireless communication means for putting wireless communication into practice, a timing pattern generating means for generating a specified timing pattern and a control means for controlling an informing device in accordance with an arbitrary timing, another communication unit comprises a wireless communication means for putting wireless communication into practice, a timing pattern analyzing means for analyzing a transmitted specified timing pattern and a control means for controlling an informing device in accordance with the analyzed timing, the one communication unit generates a specified timing pattern by the timing pattern generating means, controlling the informing device in accordance with the generated timing, transmitting the generated timing pattern to another communication unit by the wireless communication means, and another communication unit receives the timing pattern transmitted from the one communication unit by the wireless communication means and controlling the informing device in accordance with the timing pattern analyzed by the timing pattern analyzing means.

2. A communication unit position detecting system as claimed in claim 1, wherein the informing device of the one communication unit is one of a light emitting device such as an LCD or a lamp, a vibrating device such as a vibrator and a sound producing device such as a buzzer, and the informing device of another communication unit is one of a light emitting device such as an LCD or a lamp, a vibrating device such as a vibrator and a sound producing device such as a buzzer.

3. A communication unit position detecting system as claimed in claim 2, wherein the light emitting device is comprised of a device that can emit a plurality of colors and the control means executes switching control of the color of light to be emitted according to the generated timing pattern.

4. A communication unit position detecting system as claimed in claim 1, wherein the communication unit has a plurality of informing devices and is provided with a selection means for arbitrarily selecting the informing device to be used.

5. A communication unit position detecting system having a plurality of communication units connected to one another by way of a wireless network, wherein one communication unit comprises a fragrance generating means for generating a specified fragrance and a transmission means for transmitting information of the type of the generated fragrance, and another communication unit comprises a reception means for receiving information of the type of the transmitted fragrance and a display means for displaying information of the type of the received fragrance.

6. A communication unit position detecting system having a plurality of communication units connected to one another by way of a wireless network, wherein one communication unit comprises a timing pattern generating means for generating a specified timing pattern, a first wireless communication means for transmitting the generated timing pattern by a non-directional communication means and a second wireless communication means for transmitting the generated timing pattern by a directional communication means, and another communication unit comprises a first wireless communication means for receiving a non-directional electric wave, a second wireless communication means for receiving a directional electric wave and a pattern detecting means for comparing the timing patterns of the two types of electric waves received by the wireless communication means and outputting a coincidence signal when both the patterns coincide with each other.

7. A recording medium in which a communication unit position detecting program to be executed by a computer is recorded, wherein the program comprises:

a process for generating a specified timing pattern by a timing pattern generating means, a process for controlling an informing device in accordance with the generated timing pattern, a process for transmitting the generated timing pattern by a wireless communication means, and a process for receiving the transmitted timing pattern by the wireless communication means and controlling the informing device in accordance with a timing pattern analyzed by a timing pattern analyzing means.

* * * * *